US010774889B2

(12) United States Patent
Baek

(10) Patent No.: US 10,774,889 B2
(45) Date of Patent: Sep. 15, 2020

(54) BRAKE ASSEMBLY WITH BRAKE PAD CARRIER AND CLIP

(71) Applicant: MANDO CORPORATION, Gyeonggi-do (KR)

(72) Inventor: Hyungjin Baek, Novi, MI (US)

(73) Assignee: MANDO CORPORATION, Gyeonggi-Do (KR)

( * ) Notice: Subject to any disclaimer, the term of this patent is extended or adjusted under 35 U.S.C. 154(b) by 0 days.

(21) Appl. No.: 16/052,597

(22) Filed: Aug. 1, 2018

(65) Prior Publication Data
US 2020/0040953 A1   Feb. 6, 2020

(51) Int. Cl.
| | |
|---|---|
| *F16D 65/097* | (2006.01) |
| *F16D 129/04* | (2012.01) |
| *F16D 121/04* | (2012.01) |
| *F16D 127/02* | (2012.01) |
| *F16D 55/227* | (2006.01) |

(52) U.S. Cl.
CPC ..... *F16D 65/0972* (2013.01); *F16D 65/0978* (2013.01); *F16D 65/0979* (2013.01); *F16D 55/227* (2013.01); *F16D 2121/04* (2013.01); *F16D 2127/02* (2013.01); *F16D 2129/04* (2013.01)

(58) Field of Classification Search
CPC ............. F16D 65/0972; F16D 65/0978; F16D 65/0979; F16D 55/227
See application file for complete search history.

(56) References Cited

U.S. PATENT DOCUMENTS

| | | | |
|---|---|---|---|
| 6,527,090 B1 | 3/2003 | Barillot et al. | |
| 10,415,660 B2* | 9/2019 | Barbosa | F16D 55/2265 |
| 2011/0120821 A1 | 5/2011 | Shimamura | |
| 2013/0192938 A1* | 8/2013 | Miller | F16D 65/0006 |
| | | | 188/73.31 |

FOREIGN PATENT DOCUMENTS

| | | |
|---|---|---|
| JP | 2010-19364 | 1/2010 |
| KR | 10-0687013 | 2/2007 |
| KR | 10-1629189 | 6/2016 |
| KR | 10-2017-0010547 | 2/2017 |

* cited by examiner

*Primary Examiner* — Vishal R Sahni
(74) *Attorney, Agent, or Firm* — Ladas & Parry, LLP

(57) ABSTRACT

A brake assembly comprises: a brake pad carrier supporting a brake pad which is movable relative to a brake rotor, the brake pad carrier comprising a protrusion, wherein a top surface of the protrusion has at least one notch comprising a first side surface and a second side surface facing each other; and a brake pad clip comprising at least one protruding part disposed within the notch formed in the top surface of the protrusion of the brake pad carrier, wherein the first side surface and the second side surface of the notch formed in the top surface of the protrusion of the brake pad carrier form an inner shape of the notch limiting movement of the protruding part of the brake pad clip in directions toward and away from the brake rotor.

38 Claims, 19 Drawing Sheets

BRAKE ASSEMBLY WITH BRAKE PAD CARRIER AND CLIP

CROSS REFERENCE TO RELATED PATENT APPLICATION

This application is related to U.S. patent application Ser. No. 15/893,582, filed on Feb. 9, 2018, entitled "ABUTMENT CLIP FOR DISK BRAKES", the disclosure of which is hereby incorporated by reference in its entirety.

TECHNICAL FIELD

Some embodiments of the present disclosure relate to a brake assembly and, in particular, to a carrier and a clip for use in a brake pad assembly.

BACKGROUND

Disc brake systems on vehicles can include a friction material on a brake pad that rubs against a brake rotor to slow or stop a vehicle. Disc brakes can be installed to operate on one or more or all wheels of a vehicle, such as the front wheels, the back wheels, or both front and back wheels.

The brake pads can be installed in a caliper assembly, where a hydraulic or otherwise actuated piston forces the brake pad against the rotor during actuation of the brake. When the brake is not being actuated, it is desirable for the brake pad to be spaced apart from the rotor at least to prevent unnecessary wear to the brake pad. While a brake assembly frequently include at least some measures to assist in retracting the brake pad from the rotor when the brake assembly is deactuated, it can be desirable to provide additional measures to assist in retracting the brake pad such as to increase the responsiveness of the brake or to provide greater assurance of brake release.

In addition, when the brake assembly is in the deactuated state, the brake pad is not clamped tightly by the piston and caliper assembly against the rotor. In this deactuated state, the brake pad may need to still be held securely by the brake assembly. However, because the brake pad may also be allowed to move in relation to various brake assembly components during actuation, there is a risk of the brake pad moving within the holding mechanism for the brake pad, such as when the vehicle is subjected to bumps or vibration such as during operation on a roadway. This movement of the brake pad can in some cases cause rattles or other noises during vehicle operation. Generally, such noises are undesirable as they can lead to discomfort for the occupants of the vehicle and/or concerns regarding malfunction or failure of vehicle components.

In some vehicles, a brake clip can be provided as an interface between the brake pad and the rest of the disc brake assembly, for example, between the brake pad and a brake pad carrier. The brake clip can act to provide a spring action to provide a tighter fit and to preload a resisting force against movement of the brake pad within the brake pad carrier than might be possible otherwise, and which can in some cases reduce rattle or vibration. It is desirable to provide a brake pad carrier and a brake pad clip that are not disengaged in urging or retracting the brake pad against or from the brake rotor or during vehicle operation.

It would be desirable to have an apparatus and method that take into account some of the issues discussed above, as well as other possible issues.

SUMMARY

The features and advantages of the present disclosure will be more readily understood and apparent from the following detailed description, which should be read in conjunction with the accompanying drawings, and from the claims which are appended to the end of the detailed description.

Accordingly to some embodiments of the present disclosure, a brake assembly may comprise a brake pad carrier supporting a brake pad which is movable relative to a brake rotor, the brake pad carrier comprising a protrusion for being coupled to a brake pad clip, wherein at least one notch may be formed in a top surface of the protrusion of the brake pad carrier, and wherein the notch may comprise a first side surface and a second side surface facing each other and having a shape limiting movement of at least one protruding part of the brake pad clip, inserted into the notch of the brake pad carrier, in directions toward and away from the brake rotor.

In various embodiments of the present disclosure, the first and second side surfaces of the notch formed in the top surface of the protrusion of the brake pad carrier may be generally perpendicular to an axis of the brake rotor.

In certain embodiments of the present disclosure, the first and second side surfaces of the notch may extend downward from the top surface of the protrusion of the brake pad carrier.

In some embodiments of the present disclosure, the notch formed on the top surface of the protrusion of the brake pad carrier may have an inner width or diameter between the first side surface and the second side surface which is substantially equal to a width or diameter of the protruding part of the brake pad clip inserted into the notch of the brake pad carrier.

In various embodiments, the at least one protruding part of the brake pad clip inserted into the notch of the brake pad carrier may comprise a tab and/or a barb.

In certain embodiments of the present disclosure, the at least one protruding part of the brake pad clip inserted into the notch of the brake pad carrier may have a cylindrical or polygonal cross-sectional shape.

In some embodiments of the present disclosure, the at least one notch comprises two or more notches formed in the top surface of the protrusion of the brake pad carrier and the at least one protruding part of the brake pad clip may comprise two or more protruding parts of the brake pad clip to be received within the two or more notches.

In various embodiments of the present disclosure, the two or more protruding parts of the brake pad clips may have at least one of cylindrical and polygonal cross-sectional shapes.

In certain embodiments of the present disclosure, the notch formed in the top surface of the protrusion of the brake pad carrier may comprise: an opening at a side surface of the protrusion of the brake pad carrier facing the brake pad; and an angled side surface extending downward from the top surface of the protrusion of the brake pad carrier and angled toward the brake pad, wherein the opening and the angled side surface may face each other.

In some embodiments of the present disclosure, the notch formed in the top surface of the protrusion of the brake pad carrier comprises a third side surface extending downward from the top surface of the protrusion of the brake pad carrier and angled toward the brake pad.

In various embodiments of the present disclosure, the notch formed in the top surface of the protrusion of the brake pad carrier may comprise an opening at a side surface of the protrusion of the brake pad carrier facing the brake pad.

In certain embodiments of the present disclosure, the notch may comprise a fourth side surface extending downward from the top surface of the protrusion of the brake pad carrier, wherein the protruding part of the brake pad clip may be seated against a portion of the fourth side surface of the notch to limit the movement of the protruding part of the brake pad clip in a direction toward the brake pad.

In some embodiments of the present disclosure, one or more other notches may be formed in a side surface of the protrusion facing the brake pad to receive one or more other protruding parts of the brake spring.

According to various embodiments of the present disclosure, a brake assembly may comprise: a brake pad carrier supporting a brake pad which is movable relative to a brake rotor, the brake pad carrier comprising a protrusion for being coupled to a brake pad clip, wherein at least one notch may be formed in a side surface of the protrusion of the brake pad carrier facing the brake pad, and wherein the at least one notch may comprise a first side surface and a second side surface facing each other and having a shape limiting movement of at least one protruding part of the brake pad clip, inserted into the notch of the brake pad carrier, in directions toward and away from the brake rotor.

In certain embodiments of the present disclosure, the first and second side surfaces of the notch formed in the side surface of the protrusion of the brake pad carrier may be generally perpendicular to an axis of the brake rotor.

In some embodiments of the present disclosure, the notch formed in the side surface of the protrusion of the brake pad carrier may be formed from a top to a bottom of the protrusion of the brake pad carrier.

In various embodiments of the present disclosure, the notch may be formed in a portion of the side surface of the protrusion of the brake pad carrier.

In certain embodiments of the present disclosure, the at least one protruding part of the brake pad clip may comprise one or more legs protruding toward the notch formed in the side surface of the protrusion of the brake pad carrier.

In some embodiments of the present disclosure, the one or more legs of the brake pad clip may have a shape bent toward the notch formed in the side surface of the protrusion of the brake pad carrier.

In various embodiments of the present disclosure, the notch formed in the side surface of the protrusion of the brake pad carrier may have an inner width between the first side surface and the second side surface which is substantially equal to a width of the one or more legs of the brake pad clip.

In certain embodiments of the present disclosure, the one or more legs of the brake pad clip may be seated against or contact one or both of the first and second side surfaces of the notch formed in the side surface of the protrusion of the brake pad carrier.

According to some embodiments of the present disclosure, a brake assembly may comprise: a brake pad carrier supporting a brake pad which is movable relative to a brake rotor, the brake pad carrier comprising a protrusion, wherein a top surface of the protrusion may have at least one notch comprising a first side surface and a second side surface facing each other; and a brake pad clip comprising at least one protruding part disposed within the notch formed in the top surface of the protrusion of the brake pad carrier, wherein the first side surface and the second side surface of the notch formed in the top surface of the protrusion of the brake pad carrier may form an inner shape of the notch limiting movement of the protruding part of the brake pad clip in directions toward and away from the brake rotor.

In various embodiments of the present disclosure, the first and second side surfaces of the notch formed in the top surface of the protrusion of the brake pad carrier may be generally perpendicular to an axis of the brake rotor.

In certain embodiments of the present disclosure, the first and second side surfaces of the notch may extend downward from the top surface of the protrusion of the brake pad carrier.

In some embodiments of the present disclosure, the notch formed in the top surface of the protrusion of the brake pad carrier may have an inner width or diameter between the first side surface and the second side surface which is substantially equal to a width of the protruding part of the brake pad clip disposed within the notch of the brake pad carrier.

In various embodiments of the present disclosure, the at least one protruding part of the brake pad clip may comprise a tab and/or a barb.

In certain embodiments of the present disclosure, the at least one protruding part of the brake pad clip may have a cylindrical or polygonal cross-sectional shape.

In some embodiments of the present disclosure, the at least one notch may comprise two or more notches formed in the top surface of the protrusion of the brake pad carrier and the at least one protruding part of the brake pad clip may comprise two or more protruding parts of the brake pad clip to be received within the two or more notches.

In various embodiments of the present disclosure, the two or more protruding parts of the brake pad clips may have at least one of cylindrical and polygonal cross-sectional shapes.

In certain embodiments of the present disclosure, the notch formed in the top surface of the protrusion of the brake pad carrier may comprise: an opening at a side surface of the protrusion of the brake pad carrier facing the brake pad; and an angled side surface extending downward from the top surface of the protrusion of the brake pad carrier and angled toward the brake pad, wherein the opening and the angled side surface may face each other.

In some embodiments of the present disclosure, the notch formed in the top surface of the protrusion of the brake pad carrier may comprise a third side surface extending downward from the top surface of the protrusion of the brake pad carrier and angled toward the brake pad.

In various embodiments of the present disclosure, the notch formed in the top surface of the protrusion of the brake pad carrier may comprise an opening at a side surface of the protrusion of the brake pad carrier facing the brake pad.

In certain embodiments of the present disclosure, the notch may comprise a fourth side surface extending downward from the top surface of the protrusion of the brake pad carrier, wherein the protruding part of the brake pad clip may be seated against a portion of the fourth side surface of the notch to limit the movement of the protruding part of the brake pad clip in a direction toward the brake pad.

In some embodiments of the present disclosure, one or more other notches may be formed in a side surface of the protrusion facing the brake pad to receive one or more other protruding parts of the brake spring.

In various embodiments of the present disclosure, the one or more other notches may comprise fifth and sixth side surfaces facing each other, and the fifth and sixth side surfaces of the one or more other notches formed in the side surface of the protrusion of the brake pad carrier may be generally perpendicular to an axis of the brake rotor.

In certain embodiments of the present disclosure, the one or more other notches formed in the side surface of the protrusion of the brake pad carrier may be formed from a top to a bottom of the protrusion of the brake pad carrier.

In some embodiments of the present disclosure, the one or more other notches may be formed in a portion of the side surface of the protrusion of the brake pad carrier.

In various embodiments of the present disclosure, the one or more other protruding parts of the brake pad clip may comprise one or more legs protruding toward the one or more other notches formed in the side surface of the protrusion of the brake pad carrier.

In certain embodiments of the present disclosure, the one or more legs of the brake pad clip may have a shape bent toward the one or more other notches formed in the side surface of the protrusion of the brake pad carrier.

In some embodiments of the present disclosure, the one or more other notches formed in the side surface of the protrusion of the brake pad carrier may have an inner width which is substantially equal to a width of the one or more legs of the brake pad clip.

In various embodiments of the present disclosure, the one or more legs of the brake pad clip may be seated against or contact at least one of side surfaces of the one or more other notches formed in the side surface of the protrusion of the brake pad carrier.

A better understanding of the nature and advantages of the present disclosure may be gained with reference to the detailed description and the drawings below.

BRIEF DESCRIPTION OF THE DRAWINGS

Various embodiments in accordance with the present disclosure will be described with reference to the drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF EMBODIMENTS

In the following detailed description, reference is made to the accompanying drawings which form a part hereof, and in which are shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the invention. The following detailed description is therefore not to be taken in a limiting sense, and the scope of the invention is defined only by the appended claims and equivalents thereof. Like numbers in the figures refer to like components, which should be apparent from the context of use.

Figure 1:
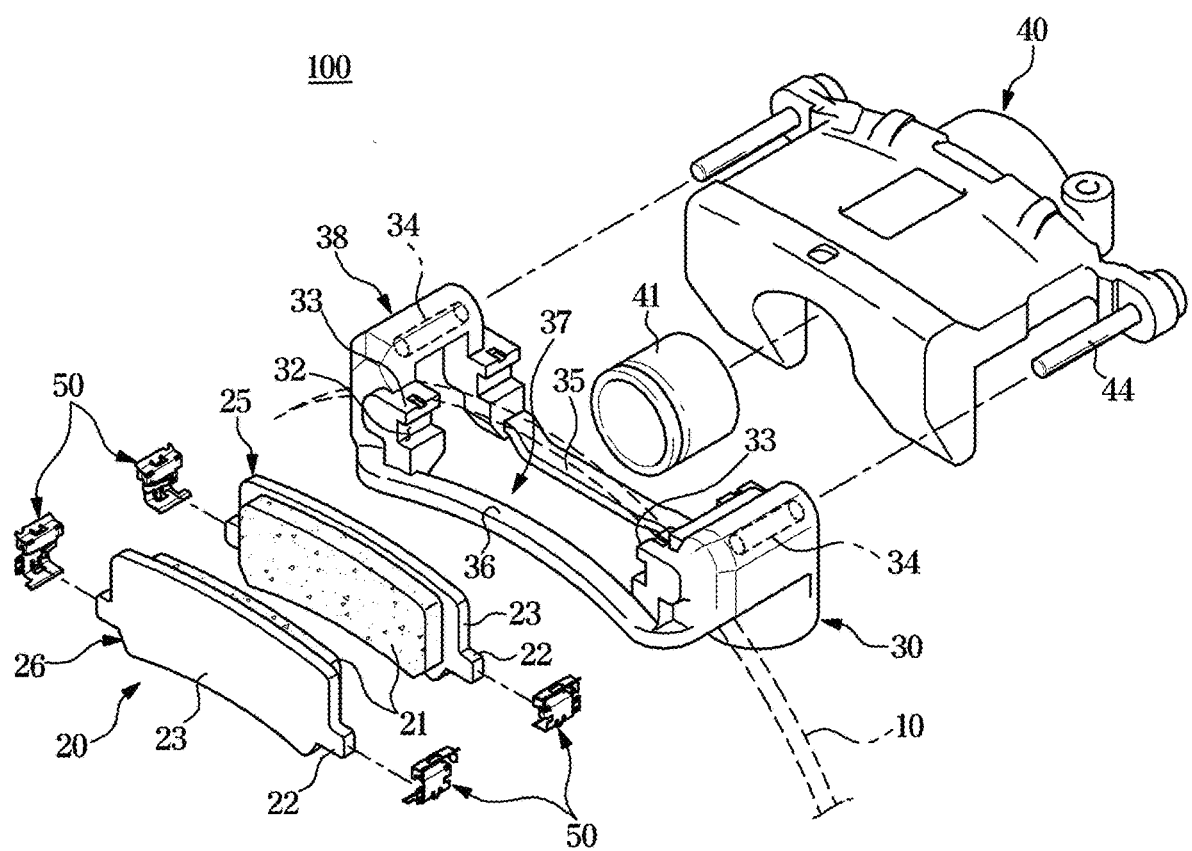
FIG. 1 illustrates an exploded view of a brake assembly according to an exemplary embodiment of the present disclosure.

FIG. 1 illustrates an exploded view of a brake assembly according to an exemplary embodiment of the present disclosure. A brake assembly 100 may comprise a brake pad carrier 30. Brake clips or springs 50 may be positioned in the brake pad carrier 30 of the brake assembly 100. In this embodiment, brake pads 20 and the brake clips 50 may be attached to the brake carrier 30. The brake clip 50 may be positioned between the brake pad 20 and the brake carrier 30. In some embodiments, the brake pad carrier 30 can be integrated into other parts of the brake assembly, such as a caliper or a caliper housing 40.

The brake assembly 100 may include a caliper assembly which typically comprises the brake pad carrier 30 and the caliper housing 40. The brake pad carrier 30 may include a pair of guide holes 34. The guide holes 34 of the brake pad carrier 30 may be each adapted to receive one of the associated guide pins 44 formed in the caliper housing 40. The caliper housing 40 may be slidably supported to the brake pad carrier 30 by a pair of guide pins 44. The guide pins 44 of the caliper housing 40 may be inserted into the guide holes 34 formed in the brake pad carrier 30. The brake pad carrier 30 may be secured to a stationary component of a vehicle, such as an axle flange or a steering knuckle.

The brake pad carrier 30 may utilize four pieces of the brake clips 50 which interface with two brake pads 20. Two brake clips 50 and one brake pad 20 may be associated with an inner arm 35 of the brake pad carrier 30, and other two brake clips 50 and another brake pad 20 may be associated with an outer arm 36 of the brake pad carrier 30. Between the inner arm 35 and the outer arm 36 is a rotor space 37, where a brake rotor 10 would be located when the brake assembly 100 is positioned on the vehicle.

Although FIG. 1 shows four brake clips 50 associated with the brake pad carrier 30, in some embodiments, two of the brake clips 50 can be connected together effectively forming a combined brake clip. Such a combined brake clip can combine the functionality and features of one brake clip 50 of the inner arm 35 and one brake clip 50 of the outer arm 36, resulting in only two clips being used.

Each of the brake pads 20 may include a pad plate 23 and a friction pad 21. The pad plate 23 may include opposite ends having outwardly projecting guide rails 22 formed thereon. The guide rails 22 of the pad plate 23 may be configured to support the brake pad 20 for sliding movement within a channel 32 of the brake pad carrier 30. Alternatively, in another embodiment, an outer brake pad 26 installed facing the outside of the vehicle can be supported by the caliper or the caliper housing 40 instead of being coupled to the brake pad carrier 30 while an inner brake pad 25 installed facing the vehicle can be supported by the brake pad carrier 30. The guide rails 22 may have a generally rectangular cross-sectional shape, although such is not required.

The brake pads 20 may be movably supported by the brake pad carrier 30. Two of the brake pad clips or springs 50 may be adapted to mate with end portions 22 of the brake pads 30. The brake clips or springs 50 may assist in retaining the brake pads 20 to the brake pad carrier 30 in addition to preventing rattle of the brake pads 30.

When pressurized fluid is forced against a piston 41, the inner brake pad 25 may be urged against the brake rotor 10 for applying friction force to the rotor 10. An inward force may be also applied by the caliper 40 to the outer brake pad 26 for urging the outer brake pad 26 against the brake rotor 10 for applying a friction force to the rotor 10.

The arms 35 and 36 respectively may include a pair of spaced apart notches or channels, indicated generally at 32, formed therein. In an exemplary embodiment of the present disclosure, the pair of channels 32 may be provided on the inner wall of the arm 35 and/or 36 and may be parallel to one another. The channels 32 may slidably support the ends 22 of the brake pads 20 having the brake clips 50 assembled therewith. Thus, in the illustrated embodiment, the channels 32 are adapted to receive the associated brake clips 50 prior to assembly of the brake pads 20 to the brake pad carrier 30.

Each of the arms 35 and 36 comprises a pair of protrusions 33. In an exemplary embodiment of the present disclosure, the pair of protrusions 33 may be provided on the inner wall of the arms 35 and/or 36 and may be formed to protrude inwardly toward the brake pad 20. The protrusions 33 of the brake pad carrier 30 may be provided to form the upper parts of the channels 33 and may be configured to support the top surface of the end portions or guide rails 22 of the brake pads 20. The protrusion 33 may be positioned between the channel 33 and the connecting arm 38, which interconnect the ends of the inner arm 35 and the outer arm 36.

Figure 2A:
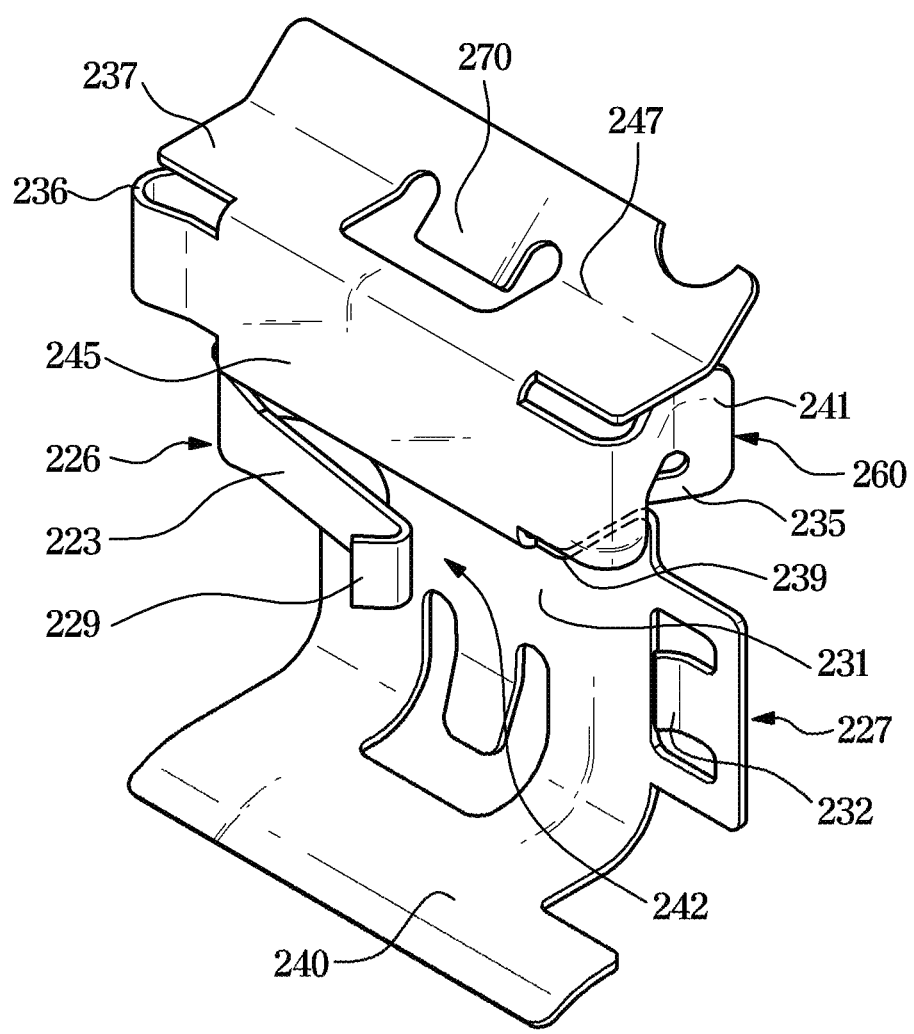
FIGS. 2A-2C show various views of a brake pad clip according to an exemplary embodiment of the present disclosure.
Figure 2B:
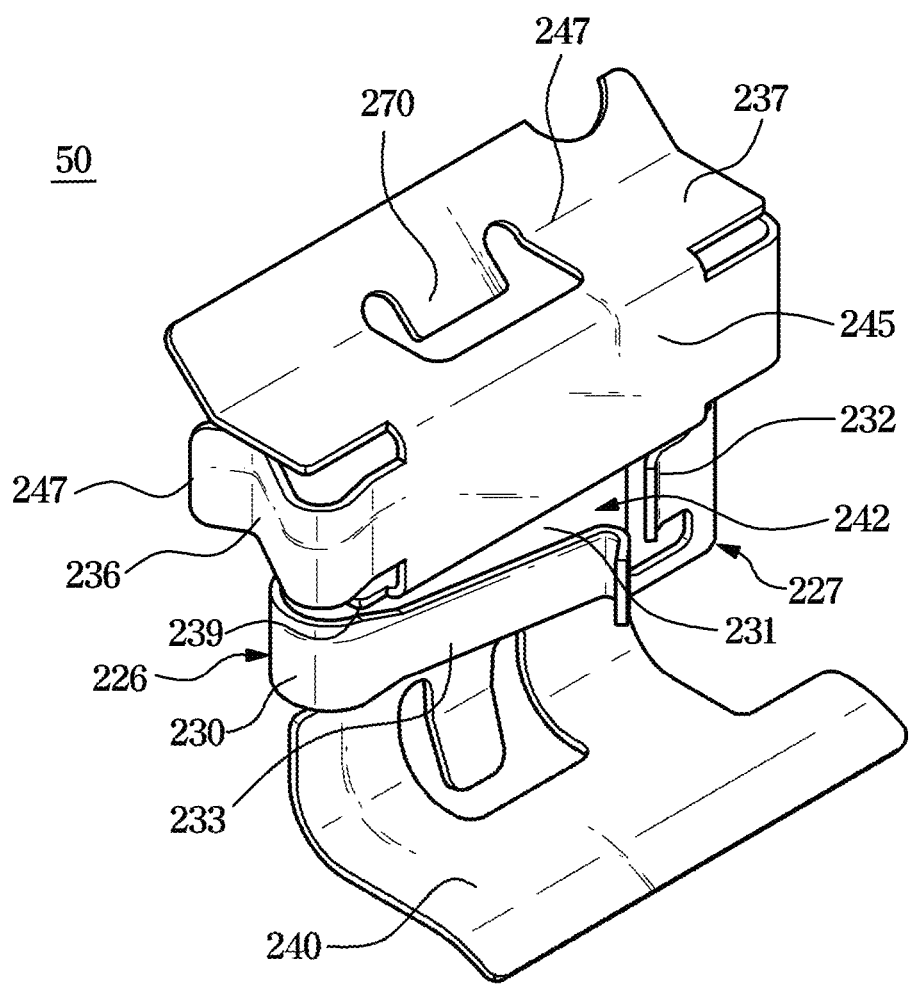
Figure 2C:
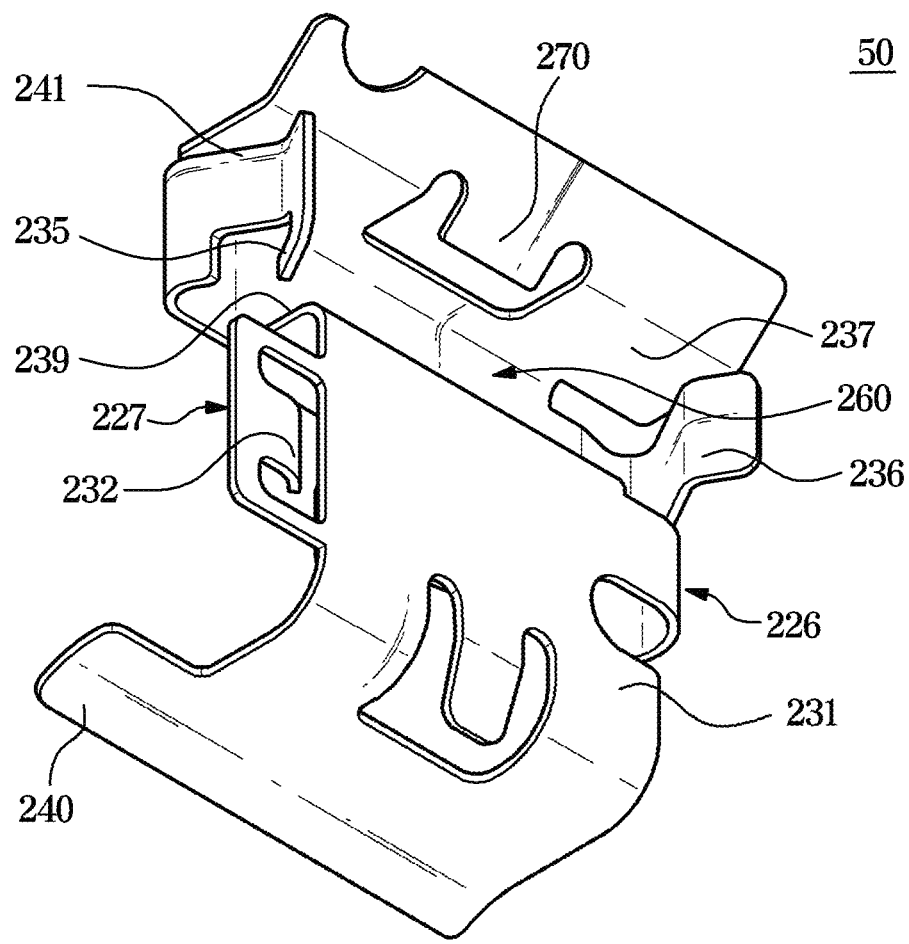

FIGS. 2A-2C show brake pad clips or springs according to an exemplary embodiment of the present disclosure. Here, a clip base 231 may be connected along one edge (e.g. a lower edge) to an edge of a pad tensioner 240, and along an opposite edge (e.g. an upper edge) to a channel upper tab or protrusion lower tab 239. As shown in FIGS. 2A-2C, the pad tensioner 240, clip base 231 and protrusion lower tab 239 form a brake pad clip channel 242. When the brake pad 20 is coupled to the brake spring 50, the brake pad clip channel 242 of the brake clip 50 may receive the ends 22 of the brake pad 20. The protrusion lower tab 239 may be connected at another edge (e.g. an upper edge) to a protrusion side tab 245 which is in turn connected to a protrusion upper tab 237. In some embodiments, the protrusion lower tab 239, protrusion side tab 245 and protrusion upper tab 237 can form a protrusion clip channel 260. When the brake spring 50 is coupled to the brake pad carrier 30, the protrusion clip channel 260 of the brake clip 50 may receive the protrusion 33 of the brake pad carrier 30. As depicted in FIGS. 2A-2C, the protrusion clip channel or U-shaped body 260 and the brake pad clip channel 242 can have openings for receiving the protrusion 33 and the brake pad 20, respectively, that open in opposite directions.

In some embodiments, the protrusion clip channel 260 can have a first protrusion side tab 241 located at the outer side or a non-rotor side edge 227. The first protrusion side tab 241 may at least partially cover or enclose one end of the opening of the protrusion clip channel 260. The protrusion clip channel 260 may have a second protrusion side tab 236 located at the rotor side edge 226. The second protrusion side tab 236 may partially or completely cover another end of the opening of the protrusion clip channel 260. The first protrusion side tab 241 and the second protrusion side tab 236 can be present and can form the part of the protrusion clip channel 260. Accordingly, in certain embodiments, the first protrusion side tab 241, the second protrusion side tab 236, the protrusion side tab 245, the protrusion upper tab 237 and the protrusion lower tab 239 may form the protrusion clip channel 260. The protrusion clip channel 260 may be configured to receive the protrusion 33 of the brake pad carrier 30 with one or more of the first protrusion side tab 241, the second protrusion side tab 236, the protrusion side tab 245, the protrusion upper tab 237 and the protrusion lower tab 239, respectively.

As shown in FIGS. 2A-2C, the brake clip 50 can have a return spring 233 extending from or attached to the rotor side edge 226 of the brake spring 50. In some embodiments, the return spring 233 may extend from or be attached to the rotor side edge 226 of the brake pad clip channel 242. For example, the return spring 233 may extend from or be attached to the rotor side edge 226 of the clip base 231 or the protrusion lower tab 239 or the pad tensioner 240.

The return spring 233 can be connected to the brake pad clip channel 242 by way of a stress-reducing shape at one end, such as a curved section of material that allows the stress associated with the brake pad 20 moving against the return spring 233 and loading the return spring 233 to be distributed over a longer section of material than a sharp corner would provide. However, in other embodiments, a sharp corner between the brake pad clip channel 242 and the return spring 233 can be effectively used or a combination of a sharp corner and a rounded section can be effectively used.

The return spring 233 may include a brake pad contactor 229 at an end opposite the connection to the brake pad clip channel 242. The brake pad contactor 229 may be configured for sliding or non-sliding contact with the brake pad 20, for example, the friction pad 20 or brake pad backing plate 23. Examples of a sliding contact include, but are not limited to, a rounded or curved portion, such as a ball or oval end or a backward curving portion of the return spring 233, at the point of contact with the brake pad 20 that can slide along the friction pad 20 or brake pad backing plate 23 as the brake pad 20 moves against the return spring 233 and loads spring energy into the return spring 233. Additional sliding shapes may include an edge, either sharp or blunt, placed at an angle to the brake pad 20 that allows the end of the return spring 233 to move along the brake pad 20 as the brake pad 20 moves against the return spring 233 and loads spring energy into the return spring 233.

In some embodiments, the spring energy may be stored into the return spring 233 by at least a portion of the return spring 233 bending as a lever, whether straight or curved, in response to the movement of the brake pad 20. Bending as a lever can include, for example, but not limited to, a substantial portion of the return spring 233 remaining substantially straight or a substantial portion of the return spring 233 curving. Substantial portions of the return spring 233 may remain straight while another substantial portion curves. In some embodiments, the spring energy may be stored by way of at least a portion of the return spring 233 bending away from the clip base 231 or the protrusion lower tab 239 or the pad tensioner 240. In certain embodiments, the spring energy may be stored by way of at least a portion of the return spring 233 bending toward the clip base 231 or the protrusion lower tab 239 or the pad tensioner 240.

In various embodiments, such as that shown in FIGS. 2A-2B, the return spring 233 may comprise a flat portion with a rounded connector 230 at one end which connects to the clip base 231, and a rounded brake pad contactor 229 at the opposite end which interacts with the brake pad 20 during operation.

In some embodiments, the first protrusion side tab 241 can include an outer axial retainer 235. Suitable outer axial retainer 235, such as that shown in FIG. 2A can extend inwardly (such as toward the protrusion 33 of the brake pad carrier 30, when installed on the brake pad carrier 30, and can be angled toward the protrusion side tab 245 or the top of the protrusion 33 such that an effort to remove the protrusion clip channel or the U-shaped body 244 from the protrusion 33 increases the force necessary to remove the protrusion clip channel or the U-shaped body 244 from the protrusion 33. The outer axial retainer 235 may have a configuration that acts as a barb that resists removal of the U-shaped body 244 from the protrusion 33. In various embodiments, one or more outer axial retainers 235 may be located on the first protrusion side tab 241. In some embodiments, an outer axial retainer 235 may be located at one or both edges of the first protrusion side tab 241. In certain embodiments, one or more outer axial retainers 235 may be located in a central portion of the first protrusion side tab 241. In various embodiments, the first protrusion side tab 241 may include one or more outer axial retainers 235 located in a central portion of the first protrusion side tab 241 and one or more outer axial retainers 235 located at one or both edges of the first protrusion side tab 241.

In some embodiments, one or more of the first protrusion side tab 241, the protrusion upper tab 237, the protrusion lower tab 239 and the second protrusion side tab 236 may comprise a curved region or an angular bend configured, for example, to expand the opening through which the protrusion 33 is received. For example, the curved region or angular bend may create a spring tension point 247 (or line or surface, collectively "point") for closing on the protrusion 33 to assist in gripping the protrusion 33. In certain embodiments, one or more of the first protrusion side tab 241, the protrusion upper tab 237, the protrusion lower tab 239 and the second protrusion side tab 236 may have a spring tension point 247 at a point on the respective tab at a point distal the protrusion side tab 245 in a central portion of the respective tab or at an end of the respective tab, with the location for each tab being independently determined.

In some embodiments, the brake pad clip channel 242 may comprise a stop tab 232 configured to retain the brake pad 20 or a portion thereof, such as the guide rail 22 of the brake pad backing plate 23, within the brake pad clip channel 242. The stop tab 232 may retain the brake pad 20 or portion thereof between the stop tab 232 and the return spring 233. The stop tab 232 may hold the brake pad 20 against the return spring 233. As shown in FIGS. 2A and 2B, the stop tab 232 can extend from the clip base 231 upwardly, either normal to the clip base 231 or angled toward the return spring 233. In other embodiments, the stop tab 232 may extend from the protrusion lower tab 239 or the pad tensioner 240 into the brake pad clip channel 242. In some embodiments, the stop tab 232 may extend normal to the protrusion lower tab 239 or pad tensioner 240 or it can extend angled toward the return spring 233. In various embodiments, the stop tab 32 may comprise a tab, such as a spring tab, that can deform against the brake pad 20. In certain embodiments, the brake pad 20 may be held in place in the brake pad carrier 30 by way of being grasped one or more brake clips 50 while the brake pad carrier 30 is separated from the brake caliper 40 and/or while the brake pad carrier 30 is positioned in the brake caliper 40. In various embodiments, the brake pad 20 may be grasped between the stop tab 232 and the return spring 233 while the brake clip 50 is positioned in the brake pad carrier 30. Such a feature of the brake pad 20 being held in place in the brake pad carrier 30 can be desirable for assembling brake systems and in servicing brake systems.

In some embodiments, the pad tensioner 240 can comprise a curved section that can be configured to exert a spring force against the guide rail 22 of the brake pad backing plate 23. The pad tensioner 40 may comprise a straight or an angled section that can be configured to exert a spring force against the guide rail 22 of the brake pad backing plate 23. The pad tensioner 40 may push against a straight or substantially straight portion of the guide rail 22 of the brake pad backing plate 23, where the surface of the guide rail 22 of the brake pad backing plate 23 contacted by the pad tensioner 240 is normal or substantially normal to the channel 32 in the brake pad carrier 30, or the clip base 231. The pad tensioner 40 may push against the guide rail 22 of the brake pad backing plate 23 to force the guide rail 22 of the brake pad backing plate 23 against the protrusion lower tab 239. The spring force applied by the pad tensioner 240 to hold the protrusion lower tab 239 against the protrusion lower tab 239 can reduce the possibility or occurrence of rattling by brake parts, such as the brake pad 20 in the brake pad carrier 30.

The brake clip 50 may include one or more parts, such as protruding parts or retainers, to assist in affixing the brake clip 50 to the brake pad carrier 30. In some embodiments, one or more parts of the brake clip 50 may be inserted into one or more of grooves, holes or notches formed in the brake pad carrier 30. For example, the protruding parts of the brake clip 50 may include, but are not limited to, reverse pointing tabs that can be configured and positioned to bite into or to increase friction when a force is applied to the brake clip 50 to remove the brake clip 50 from the brake pad carrier 30. In an exemplary embodiment, the protruding part 270 of the brake spring 50 may be a retainer present on the protrusion upper tab 237. Suitable radial retainers, such as that shown in FIGS. 2A-2C, may extend inwardly (such as toward the protrusion 33, when installed on the brake pad carrier 30) and may be angled toward the protrusion side tab 245 or the top of the protrusion 33 such that an effort to remove the protrusion clip channel or the U-shaped body 244 from the protrusion 33 increases the force necessary to remove the protrusion clip channel or the U-shaped body 244 from the protrusion 33. In some embodiments, the protruding part 270 of the brake spring 50 may have a configuration that acts as a barb that resists removal of the protrusion clip channel or the U-shaped body 244 from the protrusion 33. In various embodiments, one or more protruding parts 270 of brake clip 50 may be located on one or more of the first protrusion side tab 241, the second protrusion side tab 236, the third protrusion side tab 245, the protrusion upper tab 237 and the protrusion lower tab 239. In the exemplary embodiment shown in FIGS. 2A-2C, one or more protruding parts 270, such as a radial retainer, may be located in a central portion of the protrusion upper tab 237. However, in other embodiments, the protrusion upper tab 237 may include one or more protruding parts 270 located at one or both edges of the protrusion upper tab 237. One or more protruding parts 270 of the brake clip 50 can be located at any place of one or more of the first protrusion side tab 241, the second protrusion side tab 236, the third protrusion side tab 245, the protrusion upper tab 237 and the protrusion lower tab 239.

Referring now to FIGS. 3-5, various exemplary embodiments of one or more protrusions 33 of the brake pad carrier 30 and one or more protruding parts 270 of the brake pad springs 50 will be described. It should be appreciated that the protrusions 33 of the brake pad carrier 30 can be identical to or mirror images of one another and, similarly, the brake pad springs 50 can be identical to or mirror images of one another, although such is not required. Accordingly, only one of the protrusions 33 of the brake pad carrier 30 and the protruding parts 270 of the brake pad springs 50 will be described below in connection with the embodiments shown in FIGS. 1 and 2. However, each or some protrusions 33 of the brake pad carrier 30 and/or each or some protruding parts 270 of the brake pad springs 50 may be different from one another.

As shown in FIG. 1, one or more protrusions 33 of the brake pad carrier 30 may protrude inwardly from an inner wall of the inner arm 35 and/or the outer arm 36 of the brake pad carrier 30 toward the brake pad 20. In some exemplary embodiments, the protrusion 33 may be positioned between the channel 32 and the connecting arm 38 of the brake pad carrier 30, although such is not required. In certain embodiments, the protrusion 33 may form a portion of the channel 32, such as the upper part of the channel 32. For example, the bottom surface of the protrusion 33 may be the top surface of the channel 32. Although FIG. 1 shows that the protrusion 33 has a square block shape, the protrusion 33 may be a post, a rail, a rod or any protruding structure, with which the brake pad spring 50 can be engaged, and may have any cross-sectional shape, for example, but not limited to, a generally polygonal or circular cross-sectional shape. In some embodiments of the present disclosure, the protrusion 33 has flat surfaces, but one or more of surfaces of the protrusion 33 can be a curved surface. The protrusion 33 of the brake pad carrier 30 may have one or more angled edges.

A part of the brake pad clip or spring 50, for instance, but not limited to, the protruding part 270 shown in FIGS. 2A-2C, may be inserted into and/or coupled to the protrusion 33 of the brake pad carrier 30 such that such a part of the brake clip 50 can be affixed to the brake pad carrier 30 and the brake pad carrier 30 can support the brake pad 20 and/or the brake spring 50. For example, the part of the brake clip 50 may be configured to engage with one or more of notches, grooves and holes formed on or in one or more surfaces of the protrusion 33 of the brake pad carrier 30.

Figure 3A:
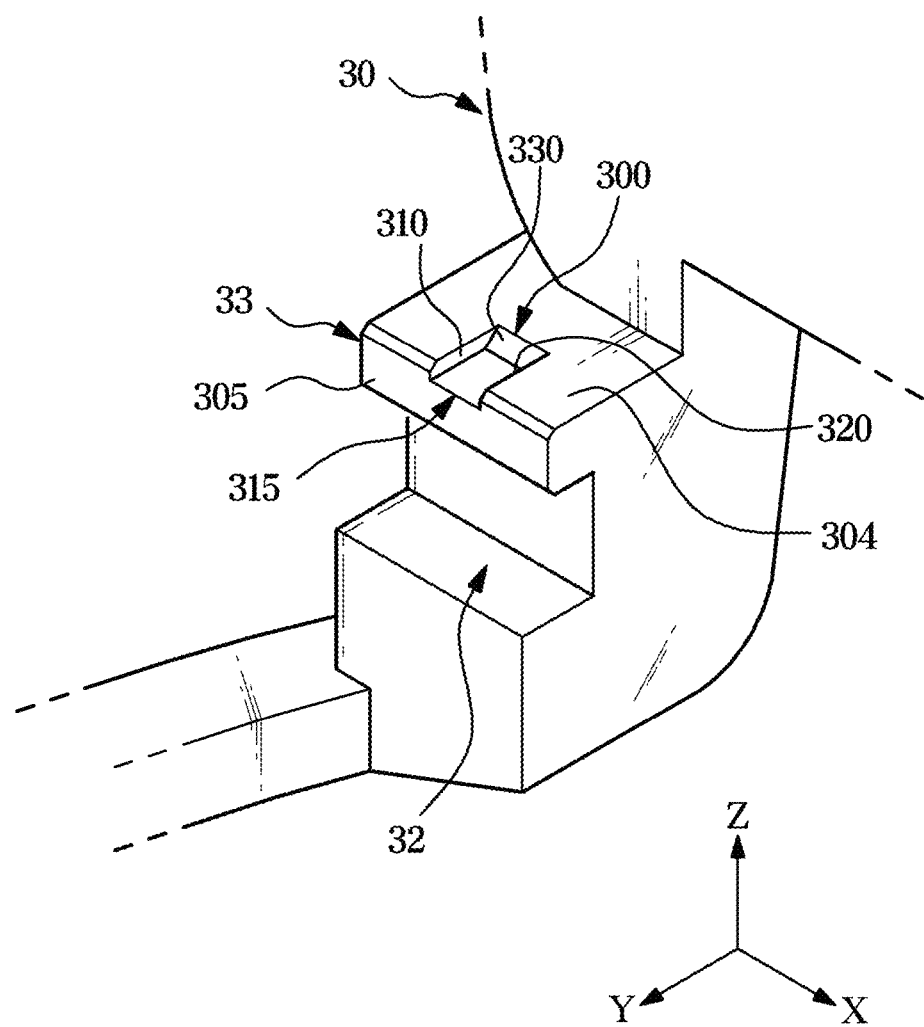
FIGS. 3A and 3B illustrate partial views of a brake pad carrier according to exemplary embodiments of the present disclosure.
Figure 3B:
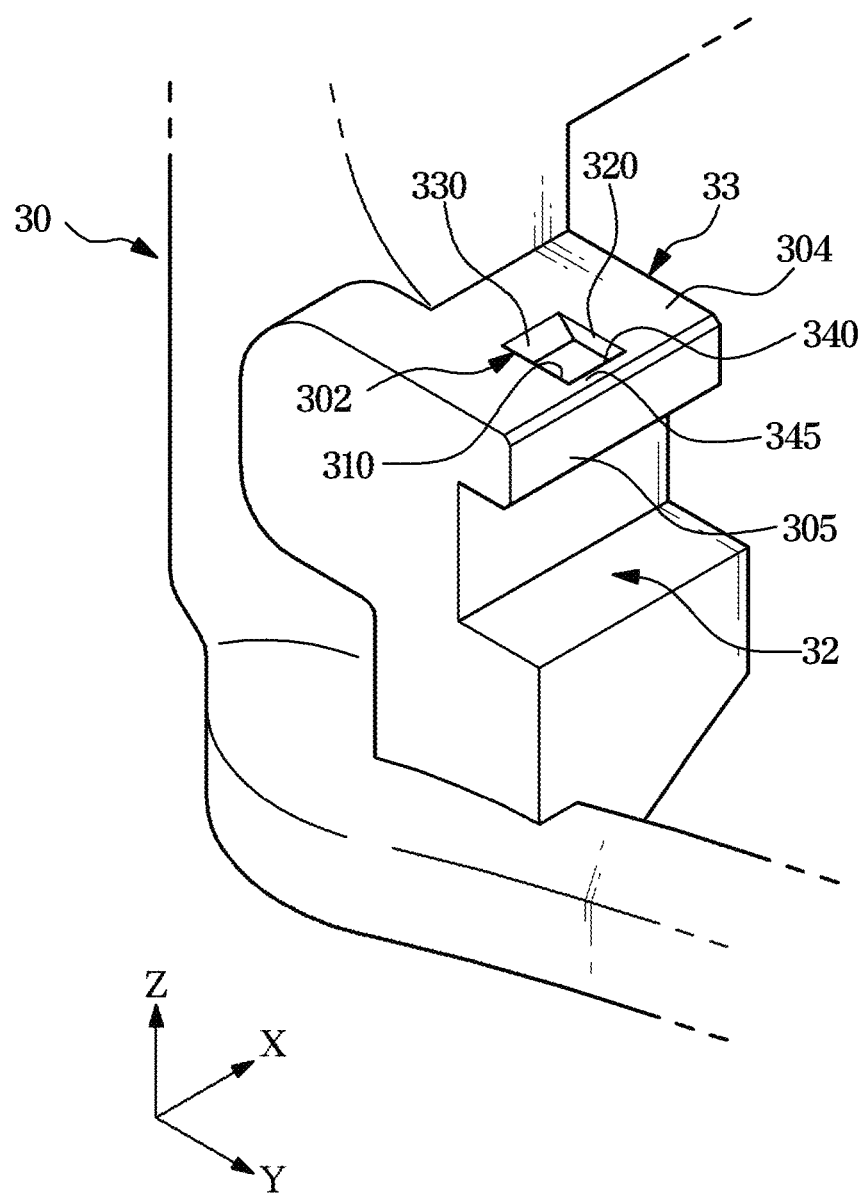

In various exemplary embodiments, one or more of surfaces of the protrusion 33 may have one or more of notches, grooves or holes. In certain exemplary embodiments, as shown in FIGS. 3A and 3B, a notch, groove or hole may be formed in the top surface of the protrusion 33 of the brake pad carrier 30. A part of the brake clip 50 may be inserted into and disposed within the notch, groove or hole of the protrusion 33 when the brake spring 50 is mounted to the brake pad carrier 30. For example, the part of the brake clip 50 may be a protrusion part protruding outwardly from the surface of the brake clip 50, such as, but not limited to, the radial retainer 270 shown in FIGS. 2A-2C, a tab, a barb, a cylindrical, square or polygonal protrusion and any protrusion that can be received in the notch, groove or hole formed in one or more surfaces of the protrusion 33. Although FIGS. 2A-2C illustrates the protruding part 270 of the brake pad spring 50 as a tab or a barb, the protruding part 270 of the brake pad spring 50 can be a square protrusion, a cylinder, a protrusion having a polygonal cross-section including at least three sides or any appropriate protrusion.

Figure 3C:
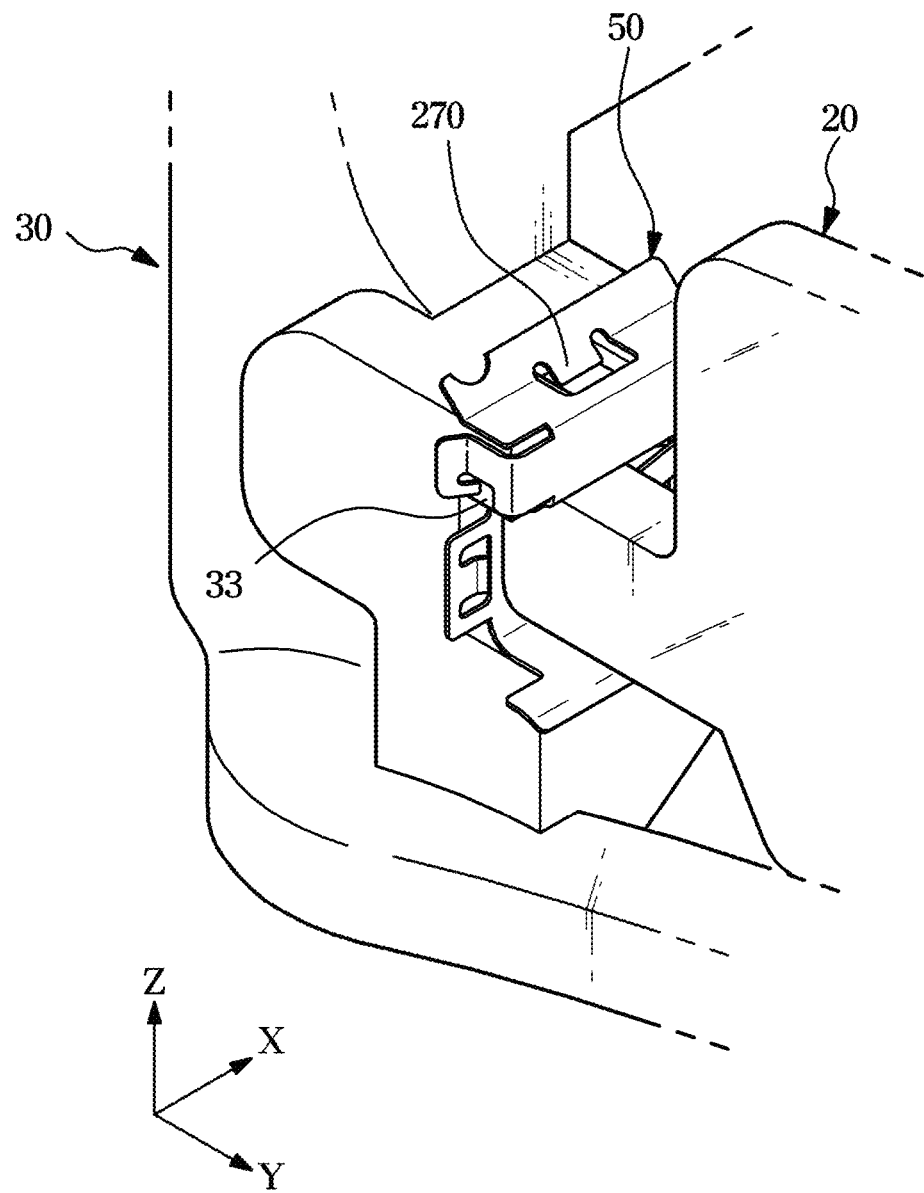
FIG. 3C illustrates a partial view of a brake assembly according to an exemplary embodiment of the present disclosure.

As illustrated in FIGS. 3A-3C, a notch, groove or hole 300 or 302 may be formed in or on the top surface 304 of the protrusion 33 of the brake pad carrier 30. In an exemplary embodiment shown in FIG. 3A, the groove, notch or hole 300 may be open at its one end toward the brake pad 20 or at the first side surface 305 of the protrusion 33. For example, the groove, notch or hole 300 may comprise an opening 315 at the first side surface 305 of the protrusion 33 facing the brake pad 20. In another exemplary embodiment shown in FIG. 3B, the hole, notch or groove 302 may end before reaching the first side surface 305 of the protrusion 33 and may have a closing wall 345 at the end of the notch or groove 302. The closing wall 345 may form a portion of the notch, hole or groove 302, for example, but not limited to, a fourth surface 340 of the notch, hole or groove 302 facing a third surface 330. The fourth surface 340 may be formed to be closer to the brake pad 20 than the third surface 330 when the brake pad 20 is coupled to the brake pad carrier 30. In operation, when the brake clip 50 is installed on the protrusion 33 of the brake pad carrier 30, the tab or barb 270 of the brake pad spring 50 may extend into the hole, groove or notch 302 which is formed in the top surface 304 of the protrusion 33. An end portion of the tab or barb 270 may engage with the fourth surface 340 of the groove 302 to positively secure the brake clip 50 to the brake pad carrier 30. For example, the notch, hole or groove 302 of the protrusion 33 of the brake pad carrier 30 and/or the protruding part 270 of the brake pad spring 50 can limit the movement of the part of the brake pad clip 50 in a second direction. The second direction may be, for instance, but not limited to, a direction toward the brake pad 20. Thus, the notch, hole or groove 302 of the protrusion 33 of the brake pad carrier 30 and/or the protruding part 270 of the brake pad spring 50 may be configured to prevent or substantially reduce movement of the brake pad spring 50 relative to the protrusion 33 and/or the channel 32 of the brake pad carrier 30 during operation of the brake assembly 100. In alternative embodiments, the end of the protruding part 270 of the brake spring 50 may contact or engage with the bottom surface of the notch, hole or groove 302. In other embodiments, the end of the protruding part 270 of the brake spring 50 may not contact or engage the fourth surface 340 or the bottom surface of the hole, notch or groove 302.

The notch, groove or hole 300 or 302 of the protrusion 33 of the brake pad carrier 30 may have a first side surface 310 and a second side surface 320 facing each other. The first side surface 310 and the second side surface 320 of the notch, groove or hole 300 or 302 may extend downward from the top surface 304 of the protrusion 33 of the brake pad carrier 30. An angled edge and/or one or more additional surfaces can be comprised between the top surface 304 of the protrusion 33 and the first or second side surface 310 or 320 of the groove, notch or hole 300 or 302. The first side surface 310 and the second side surface 320 of the notch, hole or groove 300 or 302 may limit or reduce the movement of a part of the brake pad clip or spring 50 when such a part of the brake pad clip or spring 50 is inserted into the notch or groove 300 or 302 formed in the protrusion 33 of the brake pad carrier 30. In one exemplary embodiment of the present disclosure, the first side surface 310 and the second side surface 320 of the hole, notch or groove 300 or 302 may limit the movement of a part of the brake clip 50, such as the protruding part 270, received in the hole, notch or groove 300 or 302, in at least first directions. The first directions may be, for example, but not limited to, directions toward and away from the brake rotor 10, directions perpendicular to one of the broad sides of the brake pads 20, directions that one of the brake pads 20 is movable by the piston 41, directions that the piston 41 are movable, directions perpendicular to the first side surface 310 and/or the second side surface 320, and x-axis directions. FIGS. 3A-3C illustrate the first and second side surfaces 310 and 320 of the notch, groove or hole 300 or 302 as flat surfaces, but one or both of the first and second side surfaces 310 and 320 can be implemented as a curved surface.

In an example, the inner width of the groove, hole or notch 300 or 302 formed in the top surface of the protrusion 33 of the brake pad carrier 30 may be substantially equal to a width or diameter of a part of the brake clip 50 inserted into the groove, hole or notch 300 or 302 of the brake pad carrier 30. For example, the inner width (in the x axis direction) of the groove, hole, or notch 300 or 302 formed between the first and second side surfaces 310 and 320 may be substantially identical to the width or diameter (in the x axis direction) of the protruding part 270 of the brake spring 50. A small gap between the edges of the protrusion part 270 of the brake spring 50 and the first and second side surfaces 320 and 330 of the notch, hole or groove 300 or 302 may be allowed for easiness of inserting the protrusion part 270 of the brake spring 50 into the notch, hole or groove 300 or 302. The whole width or diameter (in the x axis direction) of the protrusion part 270 of the brake spring 50 in a depth direction (such as the z axis direction) and the whole inner width (in the x axis direction) of the groove or notch 300 or 302 in a depth direction (such as the z axis direction) may not be the same as each other. Only a portion of the protrusion part 270 of the brake pad spring 50 may have a width or diameter substantially equal to an inner width of the groove, hole or notch 300 or 302 of the brake pad carrier 30. Likewise, only a portion of the groove, hole or notch 300 or 302 may have an inner width or diameter which is substantially the same as the protruding part 270 of the brake spring 50. For example, the end of the protrusion part 270 of the brake spring 50 may have a narrower width than the inner width of the groove, hole, or notch 300 or 302 of the brake pad carrier 30 and/or may have rounded corners.

The notch, hole or groove 300 or 302 of the protrusion 33 of the brake pad carrier 30 may comprise a third side surface 330 formed at the ends of the first and second side surfaces 310 and 320. However, in some embodiments, the notch, hole or groove 300 or 302 may comprise one or more other side surfaces between the first side surface 310 and the third side surface 330 and/or between the second side surface 320 and the third side surface 330. The third side surface 330 may extend downward from the top surface 304 of the protrusion 33 of the brake pad carrier 30 in an angled direction toward the opening 315, the fourth side surface 340 or the brake pad 20, although such is not required.

Further, the notch, groove or hole 300 or 302 can have any cross-sectional shape as desired. For example, the cross-sectional shape of the notch, groove or hole 300 or 302 can be triangular, rectangular, trapezoidal, nearly circular, polygonal and any appropriate shape. The polygonal shape may mean a plane figure with at least three straight or curved sides and angles. In some embodiments of the present disclosure, the notch, groove or hole 300 or 302 may comprise at least one surface that is angled or otherwise slanted, for instance, but not limited to, the third surface 330 shown in FIGS. 3A-3C.

FIG. 3C illustrates a partial view of a brake pad assembly that a brake pad, a brake carrier and a brake pad carrier are assembled according to an exemplary embodiment of the present disclosure.

Although the exemplary embodiments shown in FIGS. 2 and 3 include a single notch, groove, or hole in the top surface 304 of the protrusion 33 of the brake pad carrier 30 and a single protruding part of the brake clip 30 corresponding to the notch, groove or hole of the protrusion 33 of the brake pad carrier 30, the plurality of notches, grooves or holes may be formed in one surface of the protrusion 33 of the brake pad carrier 30 and the brake spring 50 may comprise the plurality of protruding parts corresponding to the notches, grooves or holes formed in the surface of the protrusion 33 of the brake pad carrier 30 as illustrated in FIGS. 4A-4E.

FIGS. 4A-4E illustrate a partial view of a brake pad assembly including a plurality of notches, grooves or holes formed in a protrusion of a brake pad carrier and a plurality of protruding parts of a brake pad spring according to exemplary embodiments of the present disclosure.

In various embodiments, at least one or each of the protrusions 33 of the brake pad carrier 30 may have the plurality of holes, grooves or notches 410 or 412 formed in one surface of the protrusion 33 of the brake pad carrier 30. For example, as shown in FIGS. 4A and 4C-4E, the top surface 304 of the protrusion 33 may have the plurality of holes, grooves or notches 410 or 412. In other examples, the plurality of holes, grooves or notches may be formed in one of side surfaces of the protrusion 33, a bottom surface of the protrusion 33, or any combination thereof.

Figure 4A:
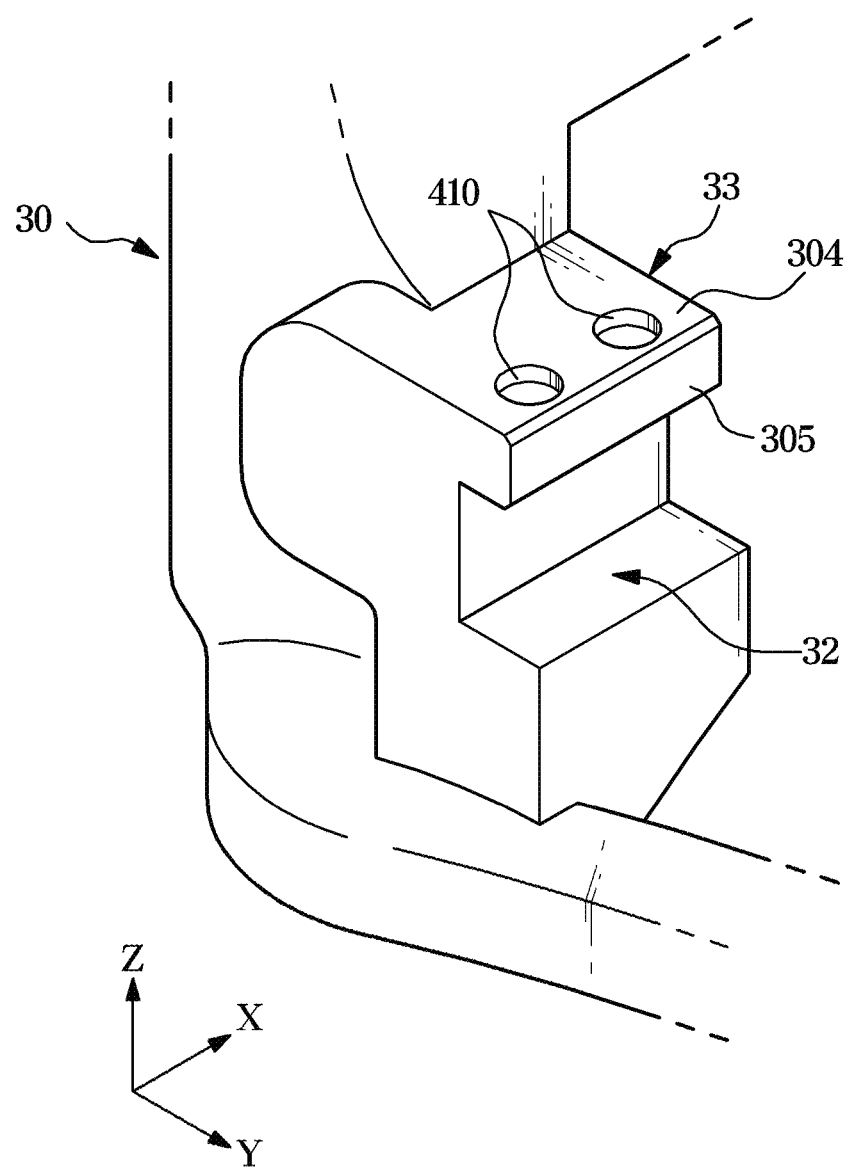
FIG. 4A shows a partial view of a brake pad carrier according to another exemplary embodiment of the present disclosure.
Figure 4B:
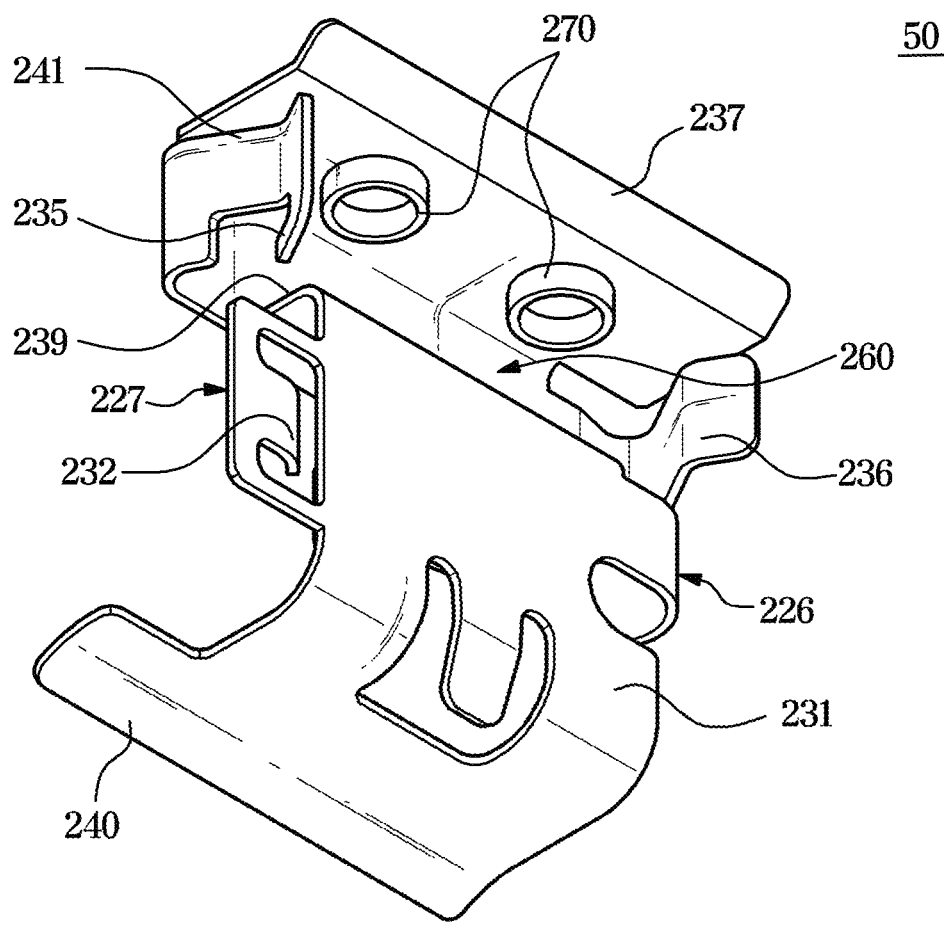
FIG. 4B shows a brake pad clip according to another exemplary embodiment of the present disclosure.
Figure 4C:
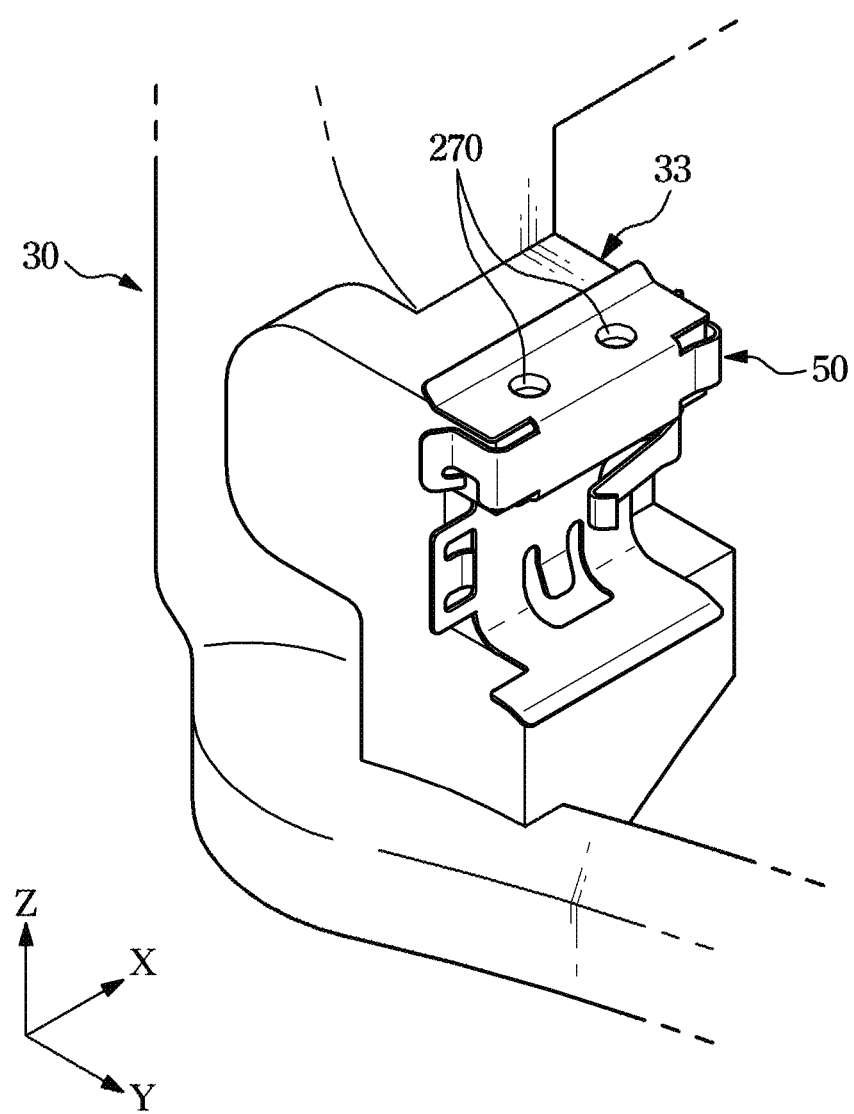
FIG. 4C shows a partial view of a brake assembly comprising a brake pad carrier and a brake pad clip according to another exemplary embodiment of the present disclosure.
Figure 4D:
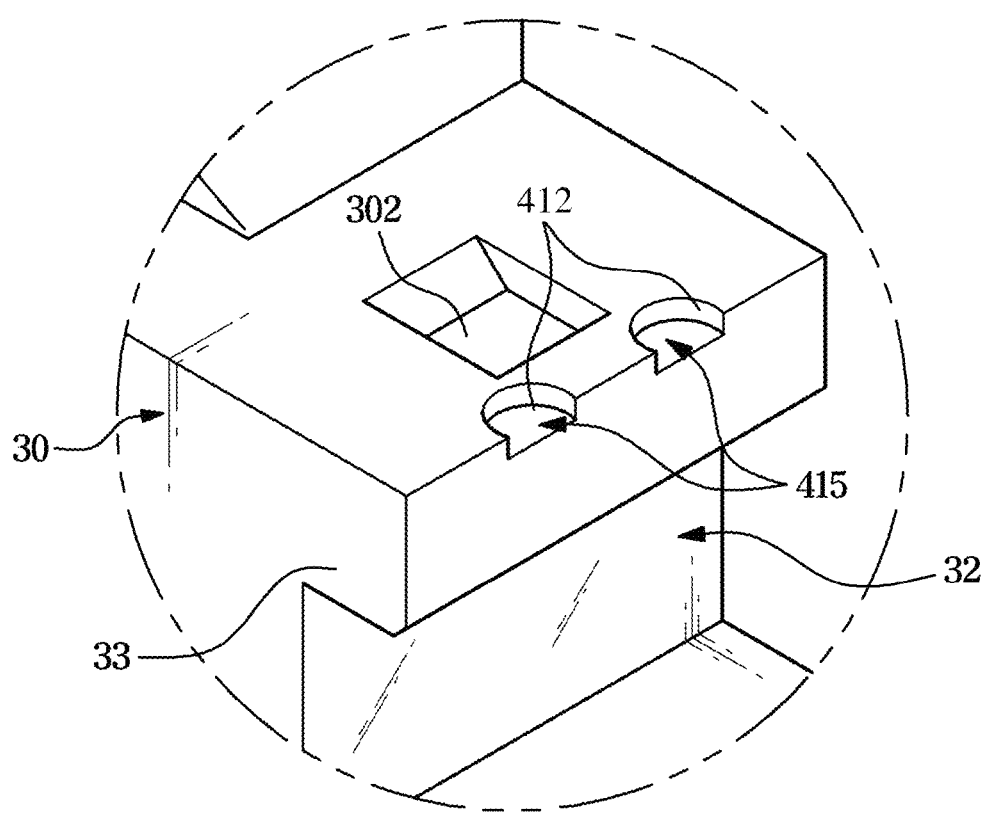
FIG. 4D shows a partial view of a brake pad carrier according to still another exemplary embodiment of the present disclosure.
Figure 4E:
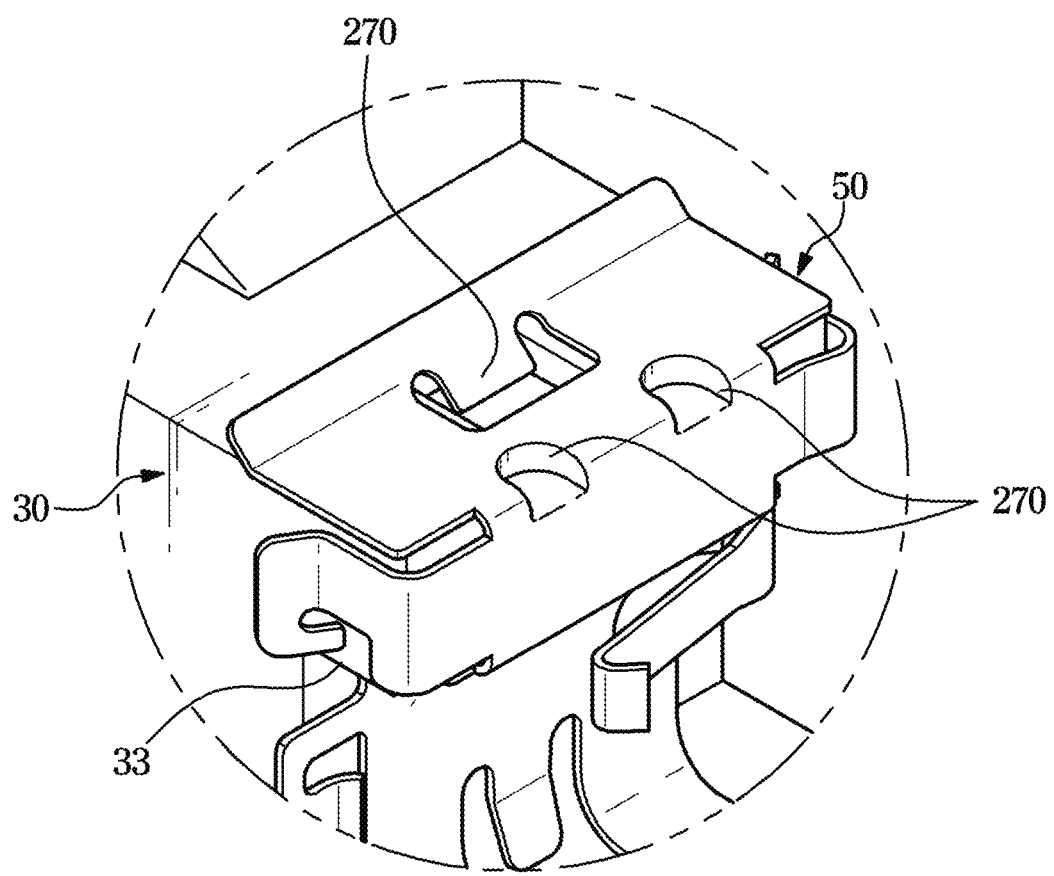
FIG. 4E shows a partial view of a brake pad carrier and a brake pad clip according to still another exemplary embodiment of the present disclosure.

In some exemplary embodiments, the grooves, notches or holes 410 may have a generally cylindrical hollow shape, a polygonal cross-sectional shape having at least three sides, or any shape that can limit the movement of the protrusion parts of the brake clip 50 that are received in the grooves, notches or holes 410. In certain exemplary embodiments, as shown in FIGS. 4D and 4E, the groove, notch or hole 412 may be open at its one end toward the brake pad 20 or at the first side surface 305 of the protrusion 33. For example, the groove, notch or hole 412 may comprise an opening 415 at the first side surface 305 of the protrusion 33 facing the brake pad 20. All grooves, notches or holes 410 or 412 formed in one surface of the protrusion 33 may have the same shape as each other. However, in some embodiment, one or some of the grooves, notches or holes 410 or 412 may have a different shape from other grooves, notches or holes 410 or 412. In the exemplary embodiment illustrated in FIGS. 4D and 4E, both a notch 302 and holes 412 may be formed in the top surface 304 of the protrusion 33 of the brake pad carrier 30, and the brake pad spring 50 may comprise the tab or barb 270 inserted into the notch 302 and two hollow cylindrical protrusions 270 received within the holes 412.

Figure 4F:
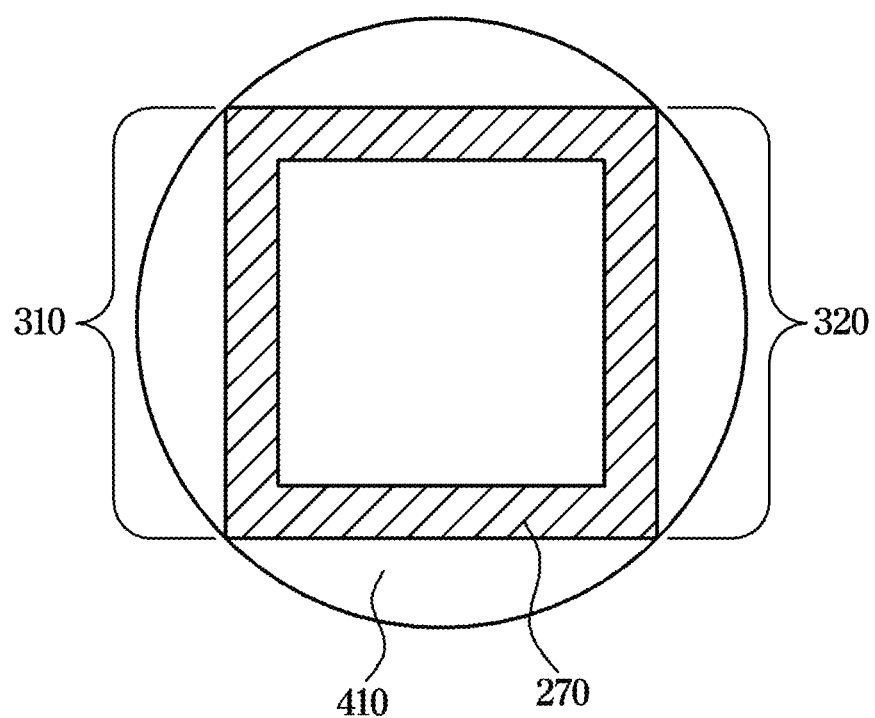
FIGS. 4F and 4G illustrate cross-sectional views of a notch formed in a brake pad carrier according to exemplary embodiments of the present disclosure.
Figure 4G:
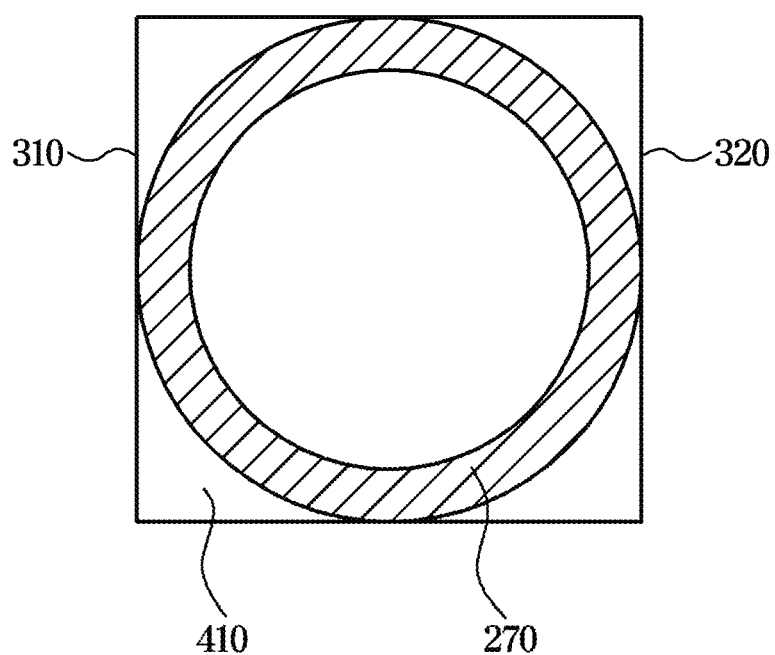

The parts of the brake clip or spring 50, for example, but not limited to, the protruding parts 270 of the brake clip or spring 50, that are inserted into the holes, grooves or notch of the protrusion 33 may have a cylindrical shape, a polygonal cross-sectional shape having at least three sides, or any shape that can be inserted into the grooves, notches or holes 410 or 412. The parts of the brake clip or spring 50 that are inserted into the holes, grooves or notch of the protrusion 33 may be hollow inside, although such is not required. The protruding parts 270 of the brake clip 50 may fit into the grooves, notches or holes 410 or 412. In some embodiments, the protruding parts 270 of the brake clip 50 may have shapes corresponding to the shapes of the grooves, notches or holes 410 or 412 of the brake pad carrier 30. For instance, the outer surface of the protruding part 270 of the brake clip 50 may have the same shape as the inner surface of the grooves, notches or holes 410 or 412 of the protrusion 33 of the brake pad carrier 30. Alternatively, in certain embodiments, as shown in FIGS. 4F and 4G, the shape of the outer surface of the protruding part 270 of the brake clip 50 may be different from the shape of the inner surface of the grooves, notches or holes 410 or 412, and only a portion of the protruding part 270 of the brake spring 50 may contact or seat against the inner surface of the grooves, notches or holes 410 or 412 of the brake pad carrier 30.

In some embodiments, the plurality of the notches, grooves or holes formed in one of surfaces of the protrusion 33 of the brake pad carrier 30 and the protruding parts of the brake pad clip 30 may prevent the rotation of the brake clip 30 during operation as well as limit the movement of the part of the brake pad clip 30 in certain directions.

Although FIGS. 3 and 4 illustrate exemplary embodiments that one or more notches, grooves or holes are formed in the top surface of the protrusion of the brake pad carrier, one or more notches, grooves or holes may be formed in one or more of other surfaces of the protrusion of the brake pad carrier. For example, one or more holes, grooves or notches may be formed in one or more of side surfaces of the protrusion, a bottom surface of the protrusion, a top surface of the protrusion, or any combination thereof.

FIGS. 5A-5E illustrate partial views of a brake pad assembly including a notch, groove or hole formed in a side surface of a protrusion of a brake pad carrier and one or more protruding parts of a brake pad spring according to exemplary embodiments of the present disclosure.

Figure 5A:
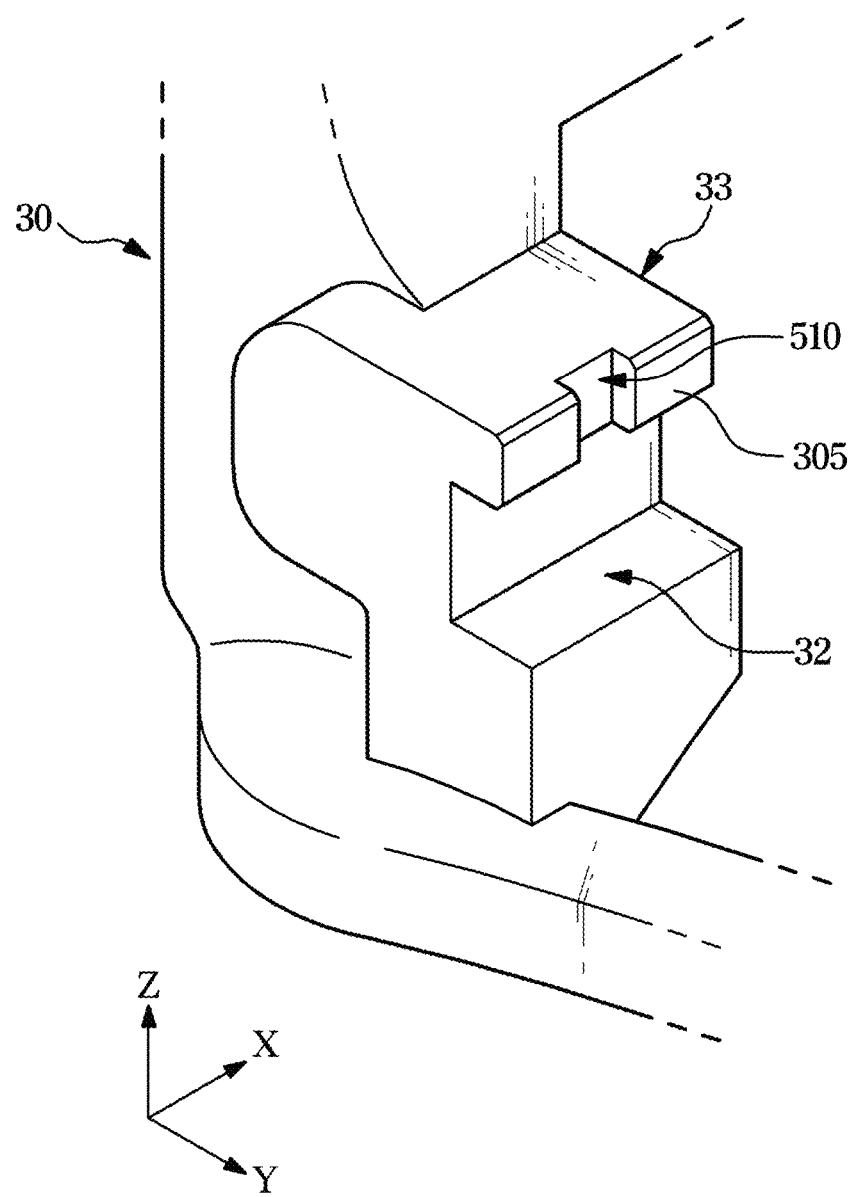
FIGS. 5A and 5B show partial views of a brake pad carrier according to other exemplary embodiments of the present disclosure.
Figure 5B:
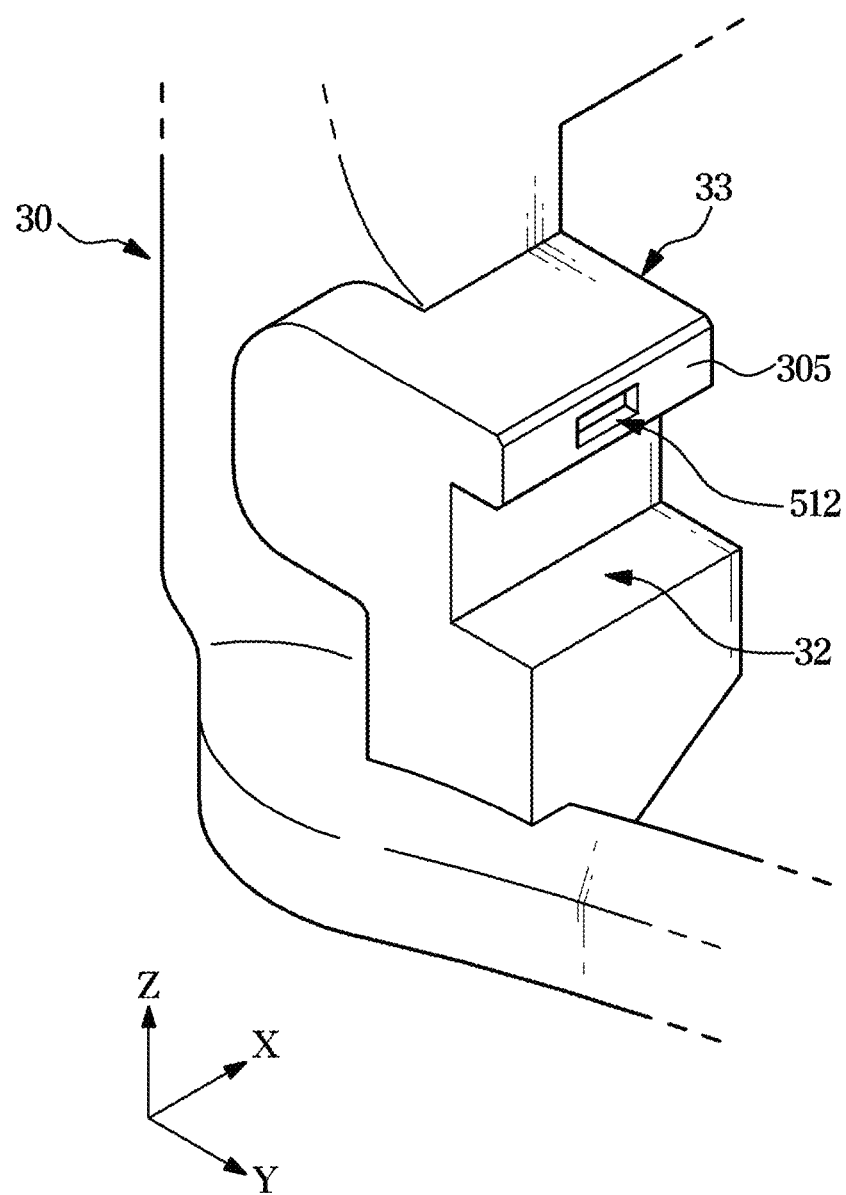

At least one notch, groove or hole 510 or 512 may be formed in one of side surfaces of the protrusion 33 of the brake pad carrier 30. In exemplary embodiments shown in FIGS. 5A and 5B, the hole, notch or groove 510 or 512 may be formed in a side surface 305 of the protrusion 33 of the brake pad carrier 30 facing the brake pad 20. As shown in FIG. 5A, the notch, hole or groove 510 may extend along an entire depth of the side surface 305 of the protrusion 33 from the top to the bottom of the protrusion 33 in a depth direction (such as the z axis direction), although such is not required. Alternatively, one or both ends of the notch, hole or groove 512 may be closed by having a wall at or adjacent to the top or/and bottom surfaces of the protrusion 33. For instance, as shown in FIG. 5B, the notch, hole or groove 512 may extend only a portion of the side surface of the protrusion 33. The notch or grove 512 may have a square, polygonal or cylindrical cross-sectional shape or any other appropriate shape that can limit the movement of the protruding part(s) 570 of the brake spring 50, for example, but not limited to, in the first directions discussed above.

Figure 5C:
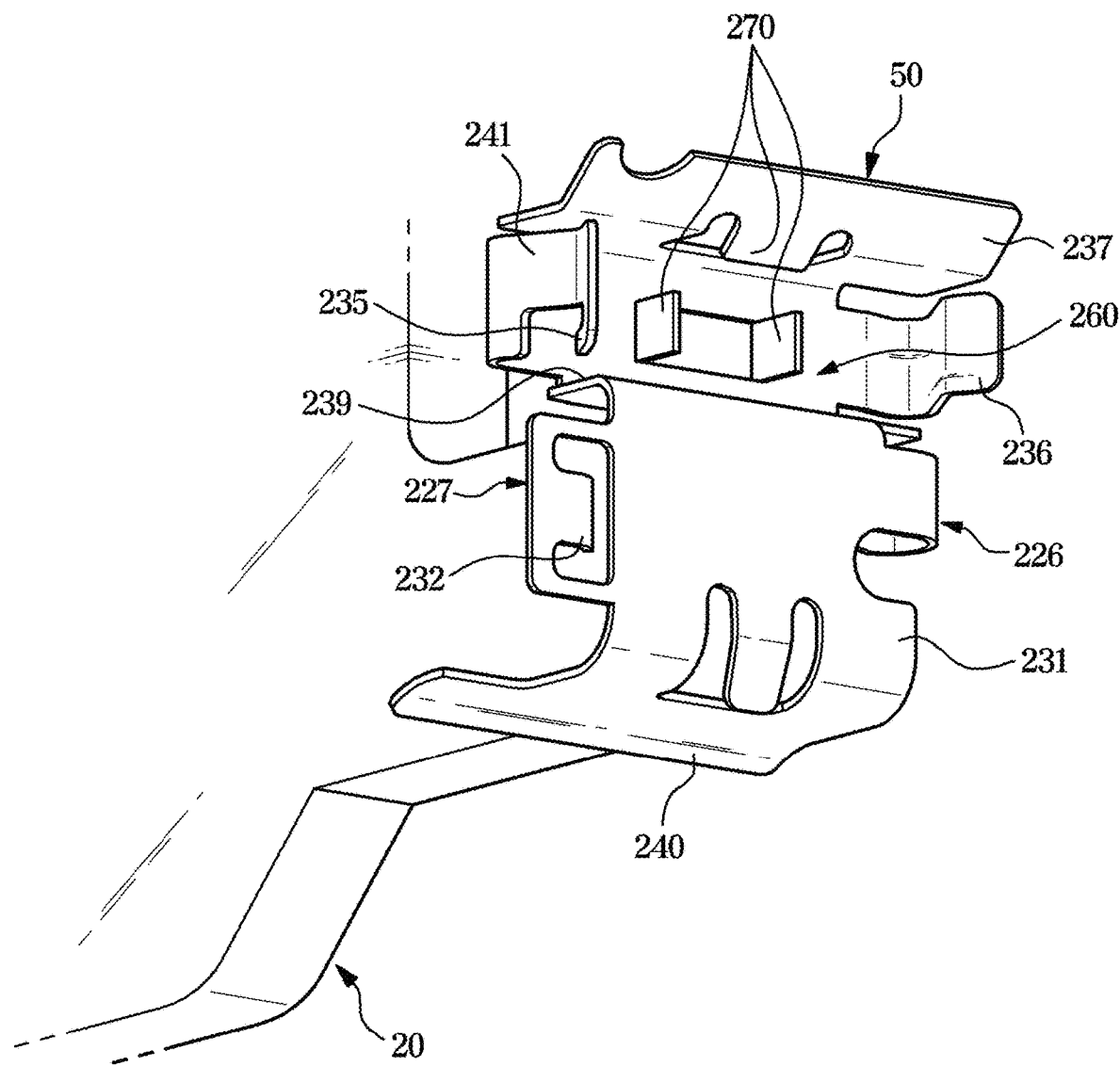
FIGS. 5C and 5D illustrates brake pad clips according to other exemplary embodiments of the present disclosure.
Figure 5D:
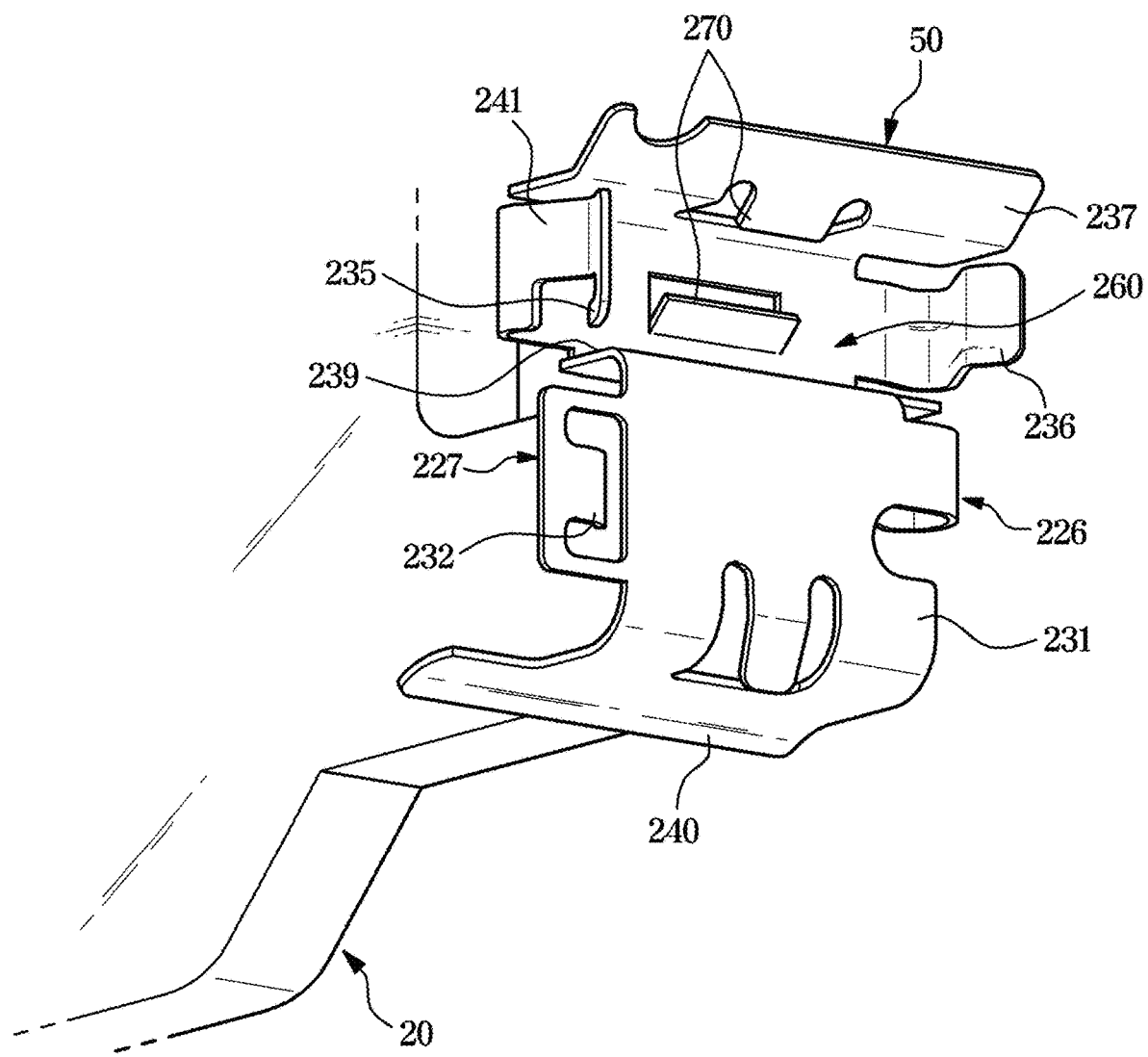
Figure 5E:
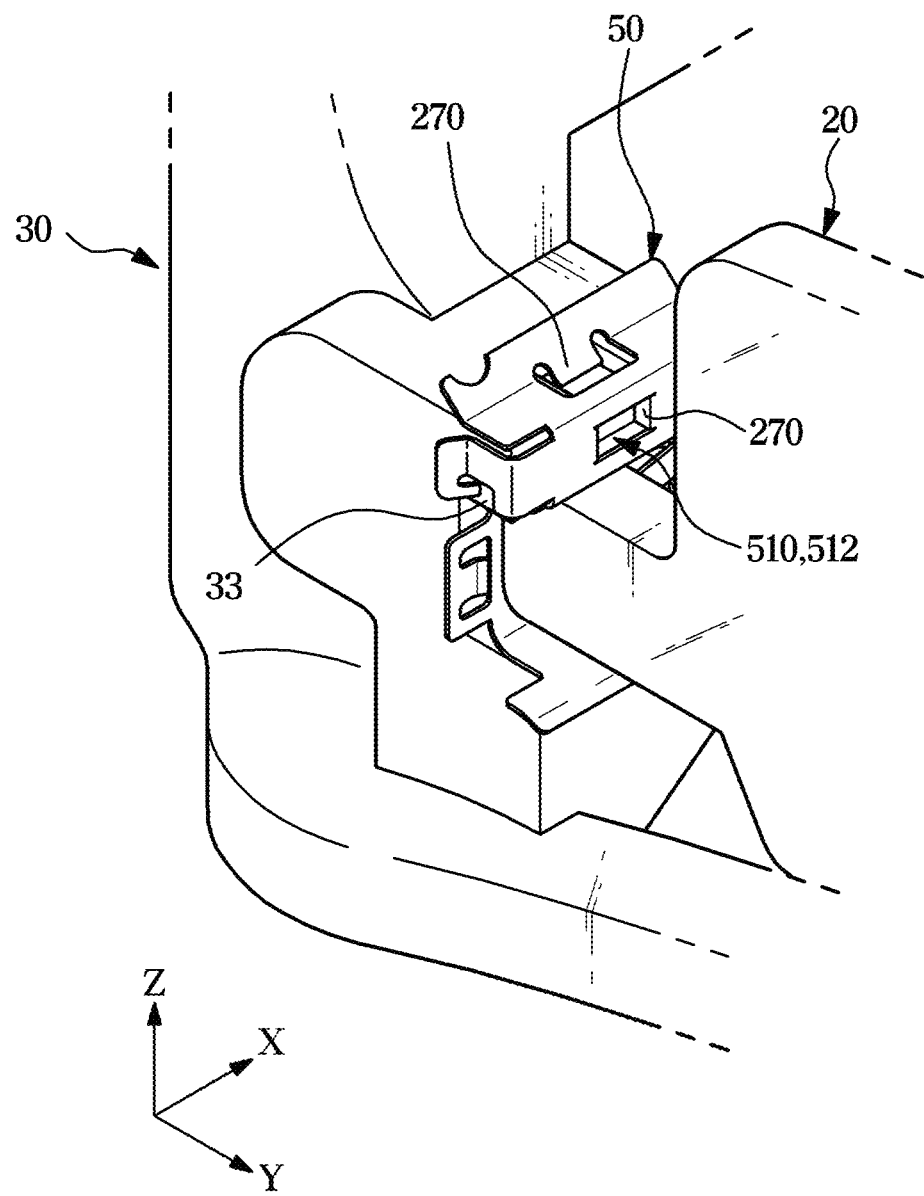
FIG. 5E illustrates a partial view of a brake assembly according to another exemplary embodiment of the present disclosure.

The part of the brake clip 50 inserted into the notch, groove or hole 510 or 512 may be formed in a portion of the brake clip 50 facing the notch, groove or hole 510 or 512 and protruding toward the notch, groove or hole 510 or 512. For example, the protruding part(s) of the brake clip 50 inserted into the notch, groove or hole 510 or 512 may have one or more legs protruding toward the notch, groove or hole 510 or 512 formed in the side surface of the protrusion 33 of the brake pad carrier 30. The leg(s) of the brake clip 50 may have a shape bent toward the notch, hole or groove 510 or 512 in a vertical or horizontal direction. In an exemplary embodiment, the protrusion side tab 245 of the brake spring 50 illustrated in FIGS. 2A-2C may comprise one or more protruding parts of the brake clip 50. The protruding part(s) of the brake clip 50, such as the protruding part(s) 270, inserted into the notch, groove or hole 510 or 512 may comprise a single leg as shown in FIG. 5C or the plurality of legs as shown in FIG. 5D. As illustrated in FIG. 5C, the part of the brake clip 50, for example, the protruding part 270, inserted into the notch, groove or hole 510 or 512 may be formed in a vertical direction. The protruding part 270 of the brake spring 50 may be angled outwardly or toward the notch, groove or hole 510 or 512 when the brake spring 50 is connected to the brake pad carrier 30. For example, as shown in FIG. 5D, the part(s) of the brake clip 50, such as the protruding part(s) 270, may be angled toward the notch 510 or 512 formed in a horizontal direction.

Although the example embodiments have been described in detail, it should be understood that various changes, substitutions and alterations can be made herein without departing from the spirit and scope of the application as defined by the appended claims.

Moreover, the scope of the present application is not intended to be limited to the particular embodiments of the process, machine, manufacture, and composition of matter, means, methods and steps described in the specification. As one of ordinary skill in the art will readily appreciate from the disclosure, processes, machines, manufacture, compositions of matter, means, methods or steps, presently existing or later to be developed, that perform substantially the same function or achieve substantially the same result as the corresponding embodiments described herein may be utilized according to the embodiments and alternative embodiments. Accordingly, the appended claims are intended to include within their scope such processes, machines, manufacture, compositions of matter, means, methods, or steps.

What is claimed is:

1. A brake assembly, comprising:
a brake pad carrier supporting a brake pad which is movable relative to a brake rotor, the brake pad carrier comprising a protrusion for being coupled to a brake pad clip,
wherein at least one notch is formed in a top surface of the protrusion of the brake pad carrier, and
wherein the notch comprises a first side surface and a second side surface facing each other and having a shape limiting movement of at least one protruding part of the brake pad clip, inserted into the notch of the brake pad carrier, in directions toward and away from the brake rotor,
wherein the at least one notch comprises two or more notches formed in the top surface of the protrusion of the brake pad carrier and the at least one protruding part of the brake pad clip comprises two or more protruding parts of the brake pad clip to be received within the two or more notches.

2. The brake assembly of claim 1, wherein the first and second side surfaces of the notch formed in the top surface of the protrusion of the brake pad carrier are generally perpendicular to an axis of the brake rotor.

3. The brake assembly of claim 1, wherein the first and second side surfaces of the notch extend downward from the top surface of the protrusion of the brake pad carrier.

4. The brake assembly of claim 1, wherein the notch formed in the top surface of the protrusion of the brake pad carrier has an inner width or diameter between the first side surface and the second side surface which is substantially equal to a width or diameter of the protruding part of the brake pad clip inserted into the notch of the brake pad carrier.

5. The brake assembly of claim 1, wherein the at least one protruding part of the brake pad clip inserted into the notch of the brake pad carrier comprises a tab and/or a barb.

6. The brake assembly of claim 1, wherein the at least one protruding part of the brake pad clip inserted into the notch of the brake pad carrier has a cylindrical or polygonal cross-sectional shape.

7. The brake assembly of claim 1, wherein the two or more protruding parts of the brake pad clips have at least one of cylindrical and polygonal cross-sectional shapes.

8. The brake assembly of claim 1, wherein the notch formed in the top surface of the protrusion of the brake pad carrier comprises:
 an opening at a side surface of the protrusion of the brake pad carrier facing the brake pad; and
 an angled side surface extending downward from the top surface of the protrusion of the brake pad carrier and angled toward the brake pad,
 wherein the opening and the angled side surface face each other.

9. The brake assembly of claim 1, wherein the notch formed in the top surface of the protrusion of the brake pad carrier comprises a third side surface extending downward from the top surface of the protrusion of the brake pad carrier and angled toward the brake pad.

10. The brake assembly of claim 1, wherein the notch formed in the top surface of the protrusion of the brake pad carrier comprises an opening at a side surface of the protrusion of the brake pad carrier facing the brake pad.

11. The brake assembly of claim 1, wherein the notch comprises a fourth side surface extending downward from the top surface of the protrusion of the brake pad carrier, wherein the protruding part of the brake pad clip is seated against a portion of the fourth side surface of the notch to limit the movement of the protruding part of the brake pad clip in a direction toward the brake pad.

12. The brake assembly of claim 1, wherein one or more other notches are formed in a side surface of the protrusion facing the brake pad to receive one or more other protruding parts of the brake spring.

13. A brake assembly, comprising:
 a brake pad carrier supporting a brake pad which is movable relative to a brake rotor, the brake pad carrier comprising a protrusion for being coupled to a brake pad clip,
 wherein at least one notch is formed in a side surface of the protrusion of the brake pad carrier facing the brake pad, and
 wherein the at least one notch comprises a first side surface and a second side surface facing each other and having a shape limiting movement of at least one protruding part of the brake pad clip, inserted into the notch of the brake pad carrier, in directions toward and away from the brake rotor,
 wherein the at least one protruding part of the brake pad clip comprises one or more legs protruding toward the notch formed in the side surface of the protrusion of the brake pad carrier.

14. The brake assembly of claim 13, wherein the first and second side surfaces of the notch formed in the side surface of the protrusion of the brake pad carrier are generally perpendicular to an axis of the brake rotor.

15. The brake assembly of claim 13, wherein the notch formed in the side surface of the protrusion of the brake pad carrier is formed from a top to a bottom of the protrusion of the brake pad carrier.

16. The brake assembly of claim 13, wherein the notch is formed in a portion of the side surface of the protrusion of the brake pad carrier.

17. The brake assembly of claim 13, wherein the one or more legs of the brake pad clip has a shape bent toward the notch formed in the side surface of the protrusion of the brake pad carrier.

18. The brake assembly of claim 13, wherein the notch formed in the side surface of the protrusion of the brake pad carrier has an inner width between the first side surface and the second side surface which is substantially equal to a width of the one or more legs of the brake pad clip.

19. The brake assembly of claim 13, wherein the one or more legs of the brake pad clip are seated against or contact one or both of the first and second side surfaces of the notch formed in the side surface of the protrusion of the brake pad carrier.

20. A brake assembly, comprising:
 a brake pad carrier supporting a brake pad which is movable relative to a brake rotor, the brake pad carrier comprising a protrusion, wherein a top surface of the protrusion has at least one notch comprising a first side surface and a second side surface facing each other; and
 a brake pad clip comprising at least one protruding part disposed within the notch formed in the top surface of the protrusion of the brake pad carrier,
 wherein the first side surface and the second side surface of the notch formed in the top surface of the protrusion of the brake pad carrier form an inner shape of the notch limiting movement of the protruding part of the brake pad clip in directions toward and away from the brake rotor,
 wherein the at least one notch comprises two or more notches formed in the top surface of the protrusion of the brake pad carrier and the at least one protruding part of the brake pad clip comprises two or more protruding parts of the brake pad clip to be received within the two or more notches.

21. The brake assembly of claim 20, wherein the first and second side surfaces of the notch formed in the top surface of the protrusion of the brake pad carrier are generally perpendicular to an axis of the brake rotor.

22. The brake assembly of claim 20, wherein the first and second side surfaces of the notch extend downward from the top surface of the protrusion of the brake pad carrier.

23. The brake assembly of claim 20, wherein the notch formed in the top surface of the protrusion of the brake pad carrier has an inner width or diameter between the first side surface and the second side surface which is substantially equal to a width of the protruding part of the brake pad clip disposed within the notch of the brake pad carrier.

24. The brake assembly of claim 20, wherein the at least one protruding part of the brake pad clip comprises a tab and/or a barb.

25. The brake assembly of claim 20, wherein the at least one protruding part of the brake pad clip has a cylindrical or polygonal cross-sectional shape.

26. The brake assembly of claim 20, wherein the two or more protruding parts of the brake pad clips have at least one of cylindrical and polygonal cross-sectional shapes.

27. The brake assembly of claim 20, wherein the notch formed in the top surface of the protrusion of the brake pad carrier comprises:

an opening at a side surface of the protrusion of the brake pad carrier facing the brake pad; and an angled side surface extending downward from the top surface of the protrusion of the brake pad carrier and angled toward the brake pad, wherein the opening and the angled side surface face each other.

28. The brake assembly of claim 20, wherein the notch formed in the top surface of the protrusion of the brake pad carrier comprises a third side surface extending downward from the top surface of the protrusion of the brake pad carrier and angled toward the brake pad.

29. The brake assembly of claim 20, wherein the notch formed in the top surface of the protrusion of the brake pad carrier comprises an opening at a side surface of the protrusion of the brake pad carrier facing the brake pad.

30. The brake assembly of claim 20, wherein the notch comprises a fourth side surface extending downward from the top surface of the protrusion of the brake pad carrier, wherein the protruding part of the brake pad clip is seated against a portion of the fourth side surface of the notch to limit the movement of the protruding part of the brake pad clip in a direction toward the brake pad.

31. The brake assembly of claim 20, wherein one or more other notches are formed in a side surface of the protrusion facing the brake pad to receive one or more other protruding parts of the brake spring.

32. The brake assembly of claim 31, wherein the one or more other notches comprise fifth and sixth side surfaces facing each other, and the fifth and sixth side surfaces of the one or more other notches formed in the side surface of the protrusion of the brake pad carrier are generally perpendicular to an axis of the brake rotor.

33. The brake assembly of claim 31, wherein the one or more other notches formed in the side surface of the protrusion of the brake pad carrier are formed from a top to a bottom of the protrusion of the brake pad carrier.

34. The brake assembly of claim 31, wherein the one or more other notches are formed in a portion of the side surface of the protrusion of the brake pad carrier.

35. The brake assembly of claim 31, wherein the one or more other protruding parts of the brake pad clip comprise one or more legs protruding toward the one or more other notches formed in the side surface of the protrusion of the brake pad carrier.

36. The brake assembly of claim 35, wherein the one or more legs of the brake pad clip has a shape bent toward the one or more other notches formed in the side surface of the protrusion of the brake pad carrier.

37. The brake assembly of claim 35, wherein the one or more other notches formed in the side surface of the protrusion of the brake pad carrier have an inner width which is substantially equal to a width of the one or more legs of the brake pad clip.

38. The brake assembly of claim 35, wherein the one or more legs of the brake pad clip are seated against or contact at least one of side surfaces of the one or more other notches formed in the side surface of the protrusion of the brake pad carrier.

* * * * *